United States Patent
Gallant et al.

(10) Patent No.: US 11,735,739 B2
(45) Date of Patent: Aug. 22, 2023

(54) PASSIVATION MATERIALS ON ALKALINE EARTH METALS

(71) Applicant: Massachusetts Institute of Technology, Cambridge, MA (US)

(72) Inventors: Betar Gallant, Cambridge, MA (US); Aaron Melemed, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/163,036

(22) Filed: Jan. 29, 2021

(65) Prior Publication Data
US 2021/0305577 A1    Sep. 30, 2021

Related U.S. Application Data

(60) Provisional application No. 63/002,007, filed on Mar. 30, 2020.

(51) Int. Cl.
| | |
|---|---|
| H01M 4/62 | (2006.01) |
| H01M 10/054 | (2010.01) |
| H01M 4/134 | (2010.01) |
| H01M 4/38 | (2006.01) |

(52) U.S. Cl.
CPC ........... *H01M 4/628* (2013.01); *H01M 4/134* (2013.01); *H01M 4/381* (2013.01); *H01M 10/054* (2013.01)

(58) Field of Classification Search
CPC ............................... H01M 4/366; H01M 4/381
See application file for complete search history.

(56) References Cited

U.S. PATENT DOCUMENTS

| | | |
|---|---|---|
| 11,453,948 B2 | 9/2022 | Gallant et al. |
| 2003/0214227 A1* | 11/2003 | Tsuchiya ............ H10K 50/8426 313/504 |
| 2017/0250438 A1* | 8/2017 | Barde .................. H01M 4/387 |

OTHER PUBLICATIONS

Li et al., Towards stable and efficient electrolytes for room-temperature rechargeable calcium batteries. Energy & Environmental Science, doi:10.1039/C9EE01699F (2019).
Ponrouch et al., Towards a calcium-based rechargeable battery. Nature Materials. 2015; 15:169, doi: 10.1038/nmat4462.
Shyamsunder et al., Reversible Calcium Plating and Stripping at Room Temperature Using a Borate Salt. ACS Energy Letters 4, 2271-2276, doi:10.1021/acsenergylett.9b01550 (2019).
Wang et al., Plating and stripping calcium in an organic electrolyte. Nature Materials 17, 16, doi:10.1038/nmat5036.
Aurbach et al., The Electrochemical Behavior of Calcium Electrodes in a Few Organic Electrolytes. J. Electrochem Soc. 1991; 138, 3536-3545.
Arroyo-De Dompablo et al., Achievements, Challenges, and Prospects of Calcium Batteries. Chem Rev. Jul. 22, 2020;120(14):6331-6357. doi: 10.1021/acs.chemrev.9b00339. Epub Oct. 29, 2019.
Besenhard et al., Inorganic film-forming electrolyte additives improving the cycling behaviour of metallic lithium electrodes and the self-discharge of carbon-lithium electrodes. J. Power Sources. Apr. 15, 1993; 44(1-3):413-20.
Dugas et al., Methods and protocols for reliable electrochemical testing in post-Li batteries (Na, K, Mg, and Ca). Chem. Mater. 2019; 31: 8613-28.

(Continued)

*Primary Examiner* — Stephan J Essex
(74) *Attorney, Agent, or Firm* — Wolf, Greenfield & Sacks, P.C.

(57) ABSTRACT

Articles and methods related to passivation materials on alkaline earth metals are generally described.

20 Claims, 17 Drawing Sheets

(56) References Cited

OTHER PUBLICATIONS

Forero-Saboya et al., Understanding the nature of the passivation layer enabling reversible calcium plating. Energy Environ Sci. 2020; 13: 3423-31.

Li et al., Revealing Nanoscale Passivation and Corrosion Mechanisms of Reactive Battery Materials in Gas Environments. Nano Lett. Aug. 9, 2017;17(8):5171-5178. doi: 10.1021/acs.nanolett. 7b02630. Epub Jul. 12, 2017.

Lu et al., Stable lithium electrodeposition in liquid and nanoporous solid electrolytes. Nat Mater. Oct. 2014;13(10):961-9. doi: 10.1038/nmat4041. Epub Aug. 10, 2014.

Melemed et al., Electrochemical Signatures of Interface-Dominated Behavior in the Testing of Calcium Foil Anodes. J Electrochem Soc. Nov. 2020;167(14):140543. doi: 10.1149/1945-7111/abc725. Epub Nov. 16, 2020.

Nakamura et al., Ionic conductivity of pure solid calcium sulfide. Transactions of the Japan Institute of Metals. 1980; 21:375-382.

Reinsberg et al., Calcium-oxygen batteries as a promising alternative to sodium-oxygen batteries. J. Phys. Chem. C. 2016; 120(39): 22179-85.

See et al., A High Capacity Calcium Primary Cell Based on the Ca—S System. Adv. Energy Mater. Apr. 2013; 3(8): 1056-61.

Tchitchekova et al., On the reliability of half-cell tests for monovalent (Li+, Na+) and divalent (Mg2+, Ca2+) cation based batteries. J. Electrochem. Soc. 2017; 164(7): A1384-92.

Yu et al., Toward a reversible calcium-sulfure battery with a lithium-ion mediation approach. Adv. Energy. Mater. Feb. 2019; 9(14): 1803794.

\* cited by examiner

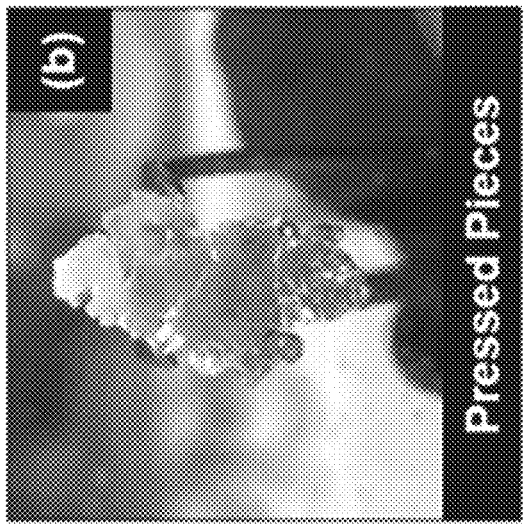
FIG. 10A
FIG. 10B
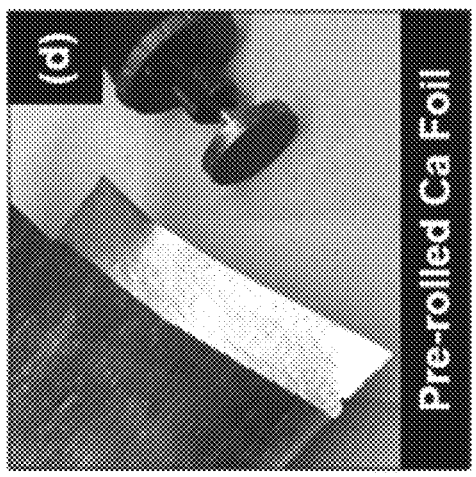
FIG. 10D
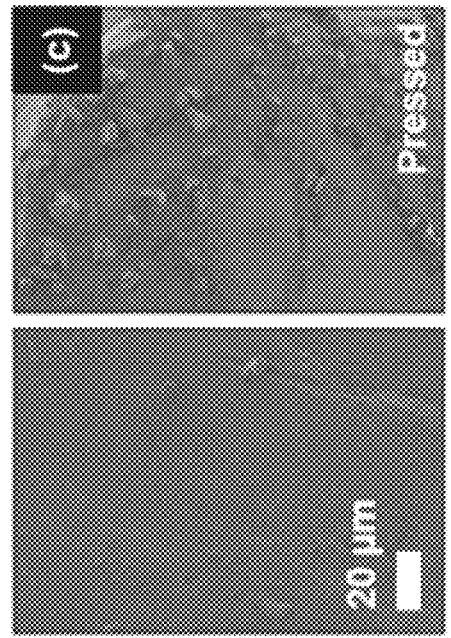
FIG. 10C

PASSIVATION MATERIALS ON ALKALINE EARTH METALS

RELATED APPLICATIONS

This application claims priority to U.S. Provisional Application No. 63/002,007, filed Mar. 30, 2020, and entitled "Passivation Materials On Alkaline Earth Metals," which is incorporated herein by reference in its entirety for all purposes.

GOVERNMENT SPONSORSHIP

This invention was made with Government support under 80NSSC19K1154 awarded by the National Aeronautics and Space Administration. The Government has certain rights in the invention.

TECHNICAL FIELD

Articles and methods related to passivation materials on alkaline earth metals are generally described.

BACKGROUND

Rechargeable batteries play a central role in energy storage technologies for portable power and consumer electronics, but their energy densities need to be increased to be viable for implementation in mass-market devices, such as electric vehicles or electrical power grids for the storage of renewable energy. The ability to form a stable solid electrolyte interphase (SEI) layer on an electrode is critical to operating an electrochemical cell at a potential below the reduction potential of the solvent used in the electrochemical cell. Conventional SEI layers are formed by immersing an electrode into an electrochemical cell containing a particular solvent and/or electrolyte, and cycling the electrochemical cell under certain operating conditions that cause reduction of the solvent and/or electrolyte and subsequent deposition of the SEI layer onto the electrode. As a result, conventional SEI layers typically contain poorly-controlled morphologies and a substantially inhomogeneous chemical composition throughout the composition of the SEI layer. In addition, alkaline earth metal electrodes, such as Ca, show promising electrochemical metrics, such as high energy densities, that may surpass those of contemporary Li metal electrodes in Li-ion batteries. Accordingly, improved articles and methods related to passivation layers on alkaline earth metals would be desirable.

SUMMARY

Articles and methods related to passivation materials on alkaline earth metals are generally described. The subject matter of the present invention involves, in some cases, interrelated products, alternative solutions to a particular problem, and/or a plurality of different uses of one or more systems and/or articles.

In certain embodiments, an article is described. In some embodiments, the article comprises a substrate comprising an alkaline earth metal, and a passivation material in direct contact with the substrate, wherein the passivation material comprises an alkaline earth fluoride in an amount greater than or equal to 90 mol. % based on the total number of moles in the passivation material.

In some embodiments, the article comprises a substrate comprising an alkaline earth metal, and a passivation material in direct contact with the substrate, wherein the passivation material comprises an alkaline earth sulfide in an amount greater than or equal to 90 mol. % based on the total number of moles in the passivation material.

In certain embodiments, a method of forming a passivation material is described. In some embodiments, the method comprises reacting a substrate comprising an alkaline earth metal with a gas, and forming the passivation material on at least a portion of the substrate, wherein the passivation material comprises an alkaline earth ionic compound.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

FIG. 10A shows, in accordance with certain embodiments, a photograph of Ca dendritic pieces as received;

FIG. 10B shows, in accordance with certain embodiments, a photograph of Ca pieces after flattening with a mechanical press;

FIG. 10C shows, in accordance with certain embodiments, a SEM image of a mechanically-pressed Ca piece;

FIG. 10D shows, in accordance with certain embodiments, a photograph of Ca foil;

DETAILED DESCRIPTION

Figure 1:
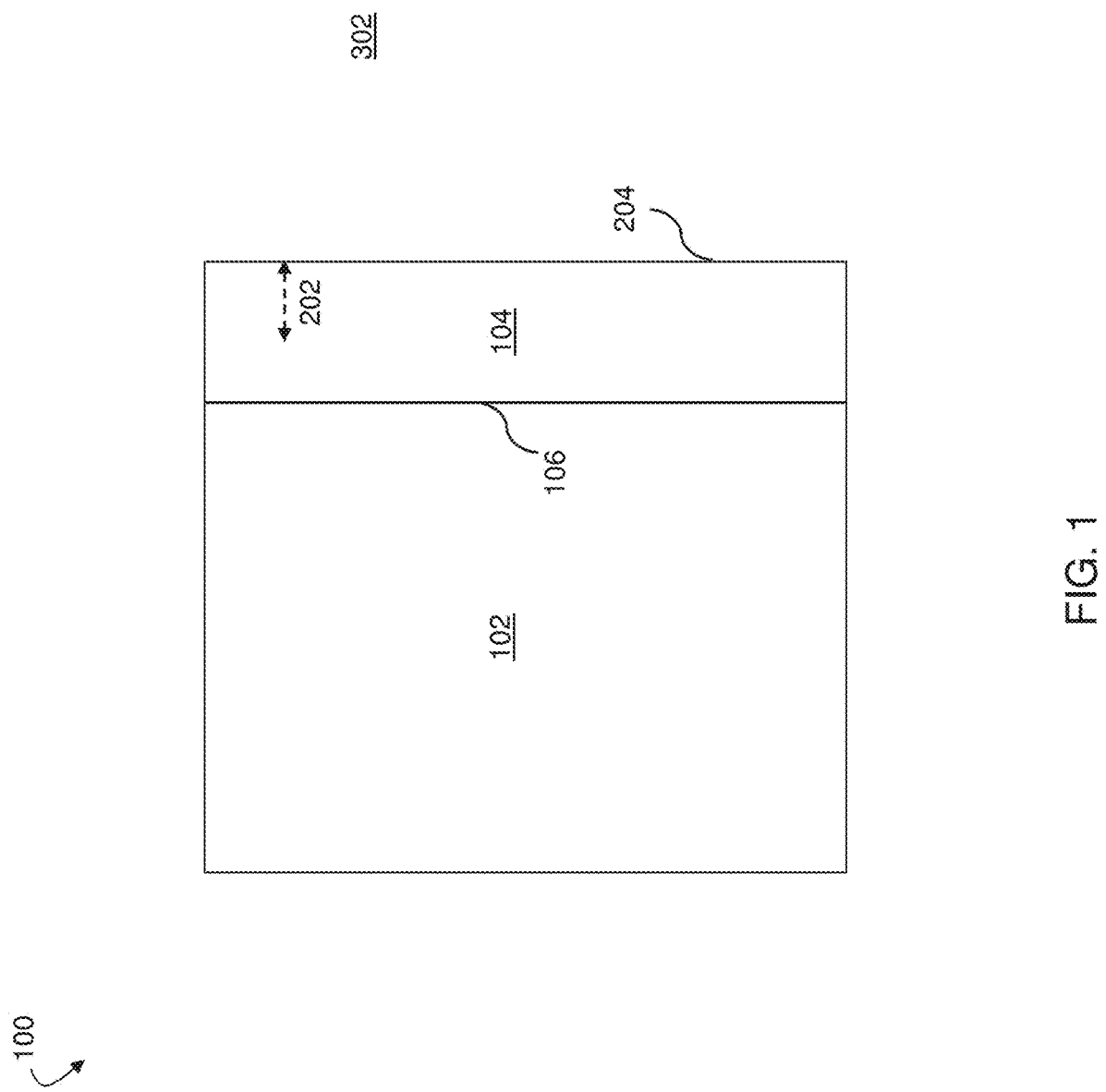
FIG. 1 shows, in accordance with certain embodiments, a schematic cross-sectional diagram of an article comprising an alkaline earth metal substrate and a passivation material.

Described herein are articles and methods related to passivation materials. According to some embodiments, an alkaline earth metal (e.g., calcium) may be reacted in an ex situ process with a gas (e.g., an inorganic gas) to yield a passivation material on the alkaline earth metal. The passivation material may be tuned, depending on the choice of reactant gas, reaction temperature, reaction pressure, and reaction time, to comprise a high concentration of an ionic compound, such as a fluoride- or sulfide-containing ionic compound of the alkaline earth metal that the passivation material is formed from, with an appropriate thickness. The reaction between the alkaline earth metal and the gas therefore produces a substantially homogenous passivation material comprising said ionic compound.

The resulting articles comprising an alkaline earth metal substrate and a passivation material coating at least a portion of the alkaline earth metal may be used, for example, as an electrode (e.g., anode) in an electrochemical cell, such as a battery (e.g., a rechargeable battery). The passivation material may be configured to protect the alkaline earth metal electrode from corrosion that may be induced by a solvent, electrolyte, and/or additive used in the electrochemical cell. Furthermore, the passivation material is electronically insulating but permits ionic conductivity (e.g., ionic transport). For example, in certain embodiments, the passivation material may allow ionic transport (e.g., the transport of ions) through the bulk of the passivation material and/or through one or more defects in the passivation material. In some embodiments, the passivation material permits ionic conductivity sufficient to cycle an electrochemical cell comprising the passivated electrode.

The formation of the passivation material is therefore a controlled, ex situ growth of a homogeneous ionic material on an alkaline metal substrate using a thermochemical approach, which is distinctive from conventional methods in several ways, explained in further detail below.

The passivation materials described herein have a uniform structure both in-plane (e.g., at the surface) and through-plane (e.g., through bulk of the material), which differs from conventional SEI layers formed on electrodes. Conventional SEI passivation layers, for example, often consist of distinct 'inner' and 'outer' domains, which may be confirmed experimentally, by, for example, XPS. In some cases, the inner layer of a conventional SEI is typically found to contain anions (e.g. $O^{2-}$, $S^{2-}$, $F^-$ etc.) that are chemically and thermodynamically stable against the alkaline earth metal (e.g., Ca). The inner layer is either formed directly (e.g., CaO through contaminant $O_2$ reaction with Ca), or as a result of a secondary reduction of a solvent and/or electrolyte derived reduction intermediate. In contrast, the outer layer of the conventional SEI is predominantly composed of organic components such as oligomers, carbonates, alkoxides, and/or non-conducting polymers that have sparing solubility within the electrolyte of the assembled battery. The various SEI components are usually not formed in isolation, resulting in a multilayer, inhomogeneous structure. Resultantly, conventional SEI layers have a poorly-controlled morphology and chemical composition, thereby blocking or exacerbating inhomogeneous alkaline earth metal deposition during cycling of the electrochemical cell. In addition, conventional SEI layers formed via electrolyte salt reduction typically involve continuous consumption of the electrolyte, which can be problematic for long-term cycling of the electrochemical cell. As described herein, a substantially homogenous ionic passivation material may be provided by reacting an alkaline earth metal directly with a gas, thereby forming a uniform material comprising an alkaline earth ionic compound on the alkaline earth metal (e.g., without 'inner' or 'outer' domains). After formation of the passivation material, the article (e.g., electrode) may be used in an electrochemical cell, such as a battery. Upon immersion of the article in the solvent and/or electrolyte, and subsequent operation of the electrochemical cell, the electrode containing the ionic passivation material yields substantially limited growth of the organic 'outer' layer as compared to conventional SEI passivation layers that have been prepared by immersion and co-reduction techniques. The article and methods described herein therefore allow for formation of a conformal passivation material, a process which cannot be achieved using traditional coating by immersion of alkaline earth metal substrates in electrolytes.

The formation of the passivation material furthermore avoids the inclusion of reduced solvent and/or electrolyte products or contaminants that accompany conventional SEI growth upon immersion of an untreated alkaline earth metal electrode directly into the electrochemical cell environment, since the passivation material described herein is formed by an ex situ reaction with gas prior to immersion of the electrode in the solvent and/or electrolyte of the electrochemical cell. The chemical composition of the ionic compound in the passivation material (e.g., ionic compounds comprising F, $S^2$ etc.) may therefore be selected to be substantially consistent throughout the composition of the passivation material, dependent on the reactive gas that is used. Additionally, higher loadings of the ionic compound may be introduced into the passivation material, as compared to conventional SEI forming reactions, therefore allowing for control of the ionic compound loading through control of reaction conditions, such as temperature and reaction time. Precise engineering of the chemical composition of the passivation material may be tuned, which is otherwise not possible in conventional approaches that are limited by the narrow subset of solvents and salts that are desirable for use in batteries.

The formation of passivation materials on alkaline earth metals, such as Ca, may provide electrochemical systems with metrics that surpass those of contemporary systems, such as Li-ion based batteries. In certain cases, for example, alkaline earth metal electrodes, such as Ca, have been shown to deposit smoothly in certain electrolytes, whereas Li-based electrodes form needle-like dendrites during deposition that can puncture cell materials and cause thermal runaway. As explained above, however, conventional SEI layers formed on alkaline earth metals, such as Ca, are generally considered to be ionically blocking in most electrolytes. As a result, chemically stable and electrochemically reversible alkaline earth electrodes have thus been limited.

According to certain embodiments, an article is described herein. In some embodiments, the article is an electrode, such as a cathode or an anode. A person of ordinary skill in the art would be familiar with the terms "cathode", which refers to the positive electrode, and "anode" which refers to the negative electrode. In certain embodiments, the article is an electrode within an electrochemical cell, such as a battery.

In some embodiments, the article comprises a substrate comprising an alkaline earth metal. The use of a substrate comprising an alkaline earth metal may be beneficial, in some embodiments, for incorporation of the article (e.g., electrode) into an electrochemical cell (e.g., a battery). In certain embodiments, for example, the article is an electrode comprising an alkaline earth metal substrate (e.g., a Ca substrate), which may be used in a battery. FIG. 1 shows, in accordance with certain embodiments, a schematic cross-sectional diagram of an article comprising an alkaline earth metal substrate. Referring to FIG. 1, article 100 comprising alkaline earth metal substrate 102 may be an electrode, in accordance with some embodiments. In certain embodiments, the substrate comprises an alkaline earth metal alloy. For example, in certain embodiments, the substrate may comprise the alkaline earth metal (e.g., Ca) alloyed with an additional metal (e.g., magnesium, aluminum, nickel, lead, tin, etc.).

According to certain embodiments, the substrate is at least partially in the form of a layer or a sheet. Referring to FIG. 1, for example, alkaline earth metal substrate 102 is in the form of a layer.

The article (e.g., electrode) may comprise the substrate in any of a variety of suitable amounts. For example, in certain embodiments, the article comprises the substrate in an amount greater than or equal to 1 molar percent (mol. %), greater than or equal to 5 mol. %, greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 80 mol. %, greater than or equal to 90 mol. %, or greater than or equal to 95 mol. % based on the total number of moles of the article. In certain embodiments, the article comprises the substrate in an amount less than or equal to 99 mol. %, less than or equal to 95 mol. %, less than or equal to 90 mol. %, less than or equal to 80 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, less than or equal to 10 mol. %, or less than or equal to 5 mol. % based on the total number of moles of the article. Combinations of the above recited ranges are also possible (e.g., the article comprises the substrate in an amount greater than or equal to 1 mol. % and less than or equal to 99 mol. % based on the total number of moles of the article, the article comprises the substrate in an amount greater than or equal to 80 mol. % and less than or equal to 90 mol. % based on the total number of moles of the article). Other ranges are also possible. In certain embodiments, the amount of the substrate (e.g., alkaline earth metal substrate) in the article (e.g., electrode) may be determined by mass spectrometry (e.g., inductively coupled plasma mass spectrometry), XPS, scanning electron microscopy (SEM) techniques such as high resolution SEM or focus ion beam SEM), and/or transmission electron microscopy (TEM).

In certain non-limiting embodiments, the article comprises the substrate in an amount of 0 mol. % or less than or equal to 1 mol. % based on the total number of moles of the article. In some such embodiments, for example, the entirety of the substrate comprising an alkaline earth metal may be reacted with a reactant gas to form the passivation layer comprising an alkaline earth ionic compound, as is explained in further detail below.

The substrate may comprise the alkaline earth metal in any of a variety of suitable amounts. For example, in certain embodiments, the substrate comprises the alkaline earth metal in an amount greater than or equal to 50 molar percent (mol. %), greater than or equal to 60 mol. %, greater than or equal to 70 mol. %, greater than or equal to 80 mol. %, greater than or equal to 90 mol. %, greater than or equal to 95 mol. %, or greater than or equal to 99 mol. % based on the total number of moles of the substrate. In certain embodiments, the substrate comprises the alkaline earth metal in an amount less than or equal to 99.9 mol. %, less than or equal to 99 mol. %, less than or equal to 95 mol. %, less than or equal to 90 mol. %, less than or equal to 80 mol. %, less than or equal to 70 mol. %, or less than or equal to 60 mol. % based on the total number of moles of the substrate. Combinations of the above recited ranges are also possible (e.g., the substrate comprises the alkaline earth metal in an amount greater than or equal to 50 mol. % and less than or equal to 99.9 mol. % based on the total number of moles of the substrate, the substrate comprises the alkaline earth metal in an amount greater than or equal to 90 mol. % and less than or equal to 95 mol. % based on the total number of moles of the substrate). Other ranges are also possible. In certain embodiments, the amount of the alkaline earth metal in the substrate may be determined by mass spectrometry (e.g., inductively coupled plasma mass spectrometry), XPS, SEM (e.g., high resolution SEM, focus ion beam SEM), and/or TEM.

In certain non-limiting embodiments, the article is an electrode comprising a substrate comprising the alkaline earth metal (e.g., Ca, Mg) in amount greater than or equal to 90 mol. % and less than or equal to 99.9 mol. % based on the total number of moles of the substrate, greater than or equal to 95 mol. % and less than or equal to 99.9 mol. % based on the total number of moles of the substrate, or greater than or equal to 99 mol. % and less than or equal to 99.9 mol. % based on the total number of moles of the substrate. In some embodiments, the substrate is a pure alkaline earth metal.

Any of a variety of alkaline earth metals may be utilized. In certain embodiments, for example, the alkaline earth metal is beryllium (Be), magnesium (Mg), calcium (Ca), strontium (Sr), or barium (Ba). For example, referring to FIG. 1, alkaline earth metal substrate 102 may be a Ca metal substrate, in certain non-limiting embodiments.

In addition to the alkaline earth metal, the substrate may comprise one or more additives, in certain embodiments. Examples of additives may include an electroactive material, a binder, and/or a filler. In some embodiments, for example, an electroactive material may be configured to adjust the potential window of the article (e.g., electrode), which may be beneficial depending on the particular solvent and/or electrolyte used during operation of the electrochemical cell. In certain embodiments, the electroactive material comprises carbon (e.g., graphite, graphene, petroleum coke, and/or mesocarbon microbeads (MCMB)), silicon, antimony, tin, tin dioxide, and/or titanium dioxide. Non-limiting examples of suitable fillers and/or binders include metals that alloy with an alkaline earth metal (e.g., aluminum, nickel, lead, tin), polymers (e.g., polyacrylonitrile (PAN) and/or carboxymethyl cellulose (CMC)). Other fillers and/or binders are possible. The substrate may comprise one or more additives in any of a variety of amounts (e.g., greater than or equal to 0.1 mol. %, greater than or equal to 1 mol. %, greater than or equal to 5 mol. %, greater than or equal to 10 mol. %, greater than or equal to 20 mol. %, greater than or equal to 30 mol. %, or more, based on the total number of moles in the substrate).

In certain embodiments, the article comprises a passivation material. As shown in FIG. 1, for example, article 100 may comprise passivation material 104. The term "passivation material", as used herein, refers to a material that functions as a shielding and/or coating material on a surface of a substrate to reduce and/or prevent chemical reactivity at the surface of the substrate. The use of a passivation material may be beneficial because, in some cases, the passivation material protects the substrate that it is disposed on from deterioration and/or decay that may be caused by external forces (e.g., a solvent and/or electrolyte of an electrochemical cell). In some embodiments, the passivation material is configured to protect at least a portion of the article from corrosion. In certain embodiments, for example, an article (e.g., electrode) may comprise an alkaline earth metal substrate and a passivation material, and the passivation material may be configured to protect at least a portion of the article (e.g., electrode) from corrosion. Corrosion of an electrode is caused, in some cases, by cycling an electrochemical cell comprising the electrode, therefore causing subsequent reactivity between the electrode and the solvent and/or electrolyte of the electrochemical cell. In some cases, other external forces in the electrochemical cell may additionally cause corrosion of the electrode, such as gases dissolved in the solvent of the electrochemical cell. In some embodiments, the passivation material is ionically conductive, which is explained in further detail herein.

As is described herein in greater detail, the passivation material may be formed by reacting the substrate comprising an alkaline earth metal with a gas. Resultantly, in certain embodiments, the passivation material comprises a product of the reaction between the alkaline earth metal and the gas. In some cases, as a result of reacting the substrate comprising the alkaline earth metal with a gas, the passivation material is disposed on the substrate. In certain embodiments, for example, the passivation material is in direct contact with the substrate. For example, referring to FIG. 1, passivation material 104 is in direct contact with alkaline earth metal substrate 102 at, for example, interface 106. In some embodiments, it is beneficial for the passivation material to be in direct contact with the substrate so that the passivation layer may protect the substrate (e.g., from corrosion), as explained in further detail above.

According to certain embodiments, the passivation material is configured such that a surface of the passivation material is exposed to an atmosphere surrounding the article. For example, in reference to FIG. 2, surface 204 of passivation material 104 is exposed to atmosphere 302 surrounding article 100. In some cases, the passivation material is configured such that at least a portion of substrate is not exposed to an atmosphere surrounding the article. Referring to FIG. 1, for example, passivation material 104 is configured such that at least a portion of alkaline earth metal substrate 102 (e.g., interface 106) is not exposed to atmosphere 302 surrounding article 100.

In certain embodiments, the passivation material is at least partially in the form of a layer or a sheet on the substrate. Referring to FIG. 1, for example, passivation material 104 is in the form of a layer on alkaline earth metal substrate 102.

The article (e.g., electrode) may comprise the passivation material in any of a variety of suitable amounts. For example, in certain embodiments, the article comprises the passivation material in an amount greater than or equal to 1 mol. %, greater than or equal to 5 mol. %, greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 80 mol. %, greater than or equal to 90 mol. %, or greater than or equal to 95 mol. % based on the total number of moles of the article. In certain embodiments, the article comprises the passivation material in an amount less than or equal to 99 mol. %, less than or equal to 95 mol. %, less than or equal to 90 mol. %, less than or equal to 80 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, less than or equal to 10 mol. %, or less than or equal to 5 mol. % based on the total number of moles of the article. Combinations of the above recited ranges are also possible (e.g., the article comprises the passivation material in an amount greater than or equal to 1 mol. % and less than or equal to 99 mol. % based on the total number of moles of the article, the article comprises the passivation material in an amount greater than or equal to 10 mol. % and less than or equal to 20 mol. % based on the total number of moles of the article). Other ranges are also possible. In certain embodiments, the amount of the passivation material in the article may be determined by mass spectrometry (e.g., inductively coupled plasma mass spectrometry), XPS, SEM (e.g., high resolution SEM, focus ion beam SEM), and/or TEM (e.g., coupled with elemental analysis).

In certain non-limiting embodiments, the article comprises the passivation material in an amount of 100 mol. % based on the total number of moles of the article. In some such embodiments, for example, the entirety of the alkaline earth metal substrate may be reacted with a reactant gas to form the passivation layer comprising the alkaline earth ionic compound, as is explained in further detail below.

According to certain embodiments, the passivation material comprises an alkaline earth ionic compound. Referring to FIG. 1, for example, passivation material 104 may comprise an alkaline earth ionic compound. As used herein, the term "ionic compound" refers to a chemical compound composed of ions held together by electrostatic attractions between oppositely charged ions (e.g., ionic bonding). A passivation material comprising an alkaline earth ionic compound may be advantageous, according to some embodiments, to promote the ionic conductivity of the passivation material, which is explained in further detail herein. In some embodiments, the alkaline earth ionic compound is an ionic compound of the alkaline earth metal. Resultantly, in certain embodiments, the alkaline earth ionic compound is chemically and thermodynamically stable against the alkaline earth metal.

The passivation material may comprise any of a variety of alkaline earth ionic compounds. According to certain embodiments, the alkaline earth ionic compound is an alkaline earth fluoride. In some embodiments, for example, the alkaline earth ionic compound is $CaF_2$ or $MgF_2$. In certain embodiments, the alkaline earth ionic compound is an alkaline earth sulfide. For example, according to some embodiments, the alkaline earth ionic compound is CaS or MgS. In some embodiments, the alkaline earth ionic compound is an alkaline earth nitride. For example, according to certain embodiments, the alkaline earth ionic compound is $Ca_3N_2$ or $Mg_3N_2$.

In certain embodiments, the alkaline earth ionic compound may be stable across a wide potential range. For example, in certain embodiments, the alkaline earth ionic compound may be stable at a potential between greater than or equal to 0 V vs. the alkaline earth metal and less than or equal to 6 V vs. the alkaline earth metal.

The passivation material may comprise the alkaline earth ionic compound in any of a variety of suitable amounts. For example, in certain embodiments, the passivation material comprises the alkaline earth ionic compound in an amount greater than or equal to 70 mol. %, greater than or equal to 80 mol. %, greater than or equal to 90 mol. %, greater than or equal to 95 mol. %, or greater than or equal to 99 mol. % based on the total number of moles in the passivation material. In certain embodiments, the passivation material comprises the alkaline earth ionic compound in an amount less than or equal to 99.9 mol. %, less than or equal to 99 mol. %, less than or equal to 95 mol. %, or less than or equal to 90 mol. %, or less than or equal to 80 mol. % based on the total number of moles in the passivation material. Combinations of the above recited ranges are also possible (e.g., the passivation material comprises the alkaline earth ionic compound in an amount greater than or equal to 70 mol. % and less than or equal to 99.9 mol. % based on the total number of moles in the passivation material, the passivation material comprises the alkaline earth ionic compound in an amount greater than or equal to 90 mol. % and less than or equal to 95 mol. % based on the total number of moles in the passivation material). Other ranges are also possible. In certain embodiments, the amount of the alkaline earth ionic compound in the passivation material may be determined by mass spectrometry (e.g., inductively coupled plasma mass spectrometry), XPS, SEM (e.g., high resolution SEM, focus ion beam SEM), and/or TEM (e.g., coupled with elemental analysis).

In some embodiments, the passivation material substantially covers the surface area of the substrate. For example, in certain embodiments, the passivation material covers greater than or equal to 50%, greater than or equal to 60%, greater than or equal to 70%, greater than or equal to 80%, greater than or equal to 85%, greater than or equal to 90%, greater than or equal to 95%, greater than or equal to 98%, or greater than or equal to 99% of the surface area of the substrate. In some embodiments, the passivation material covers less than or equal to 100%, less than or equal to 99%, less than or equal to 98%, less than or equal to 95%, less than or equal to 90%, less than or equal to 85%, less than or equal to 80%, less than or equal to 70%, or less than or equal to 60% of the surface area of the substrate. Combinations of the above recited ranges are also possible (e.g., the passivation material coves greater than or equal to 50% and less than or equal to 100% of the surface area of the substrate, the passivation material covers greater than or equal to 90% and less than or equal to about 95% of the substrate). Other ranges are also possible.

In some embodiments, the passivation material is crystalline (e.g., single crystalline or polycrystalline). For example, referring to FIG. 1, passivation material 104 may be polycrystalline. In some embodiments, for example, the passivation material comprises nanocrystals (e.g., cubic nanocrystals) with various sizes (e.g., greater than or equal to 1 nm, greater than or equal to 10 nm, greater than or equal to 50 nm, greater than or equal to 100 nm, etc.). In certain embodiments, the crystalline passivation material comprises one or more crystallographic defects (e.g., a point defect) and/or grain boundaries, so that the solid state passivation material conducts ions (e.g., from the alkaline earth metal substrate, through the passivation material, and to an atmosphere surrounding the article), as explained in greater detail below. Methods of determining the crystallinity of the passivation material, and/or the physical properties of the crystalline passivation material (e.g., nanocrystal size) include, for example, TEM (e.g., electron diffraction in TEM), atomic force microscopy (AFM), and/or XRD.

In certain embodiments, the passivation material is ionically conductive. Those of ordinary skill in the art would be familiar with ionic conductivity, which refers to the ability of a material to conduct and/or transport ions to a substantial degree. Those of ordinary skill in the art would be capable of determining whether a material is ionically conductive, and quantifying the degree of its ionic conductivity, by calculating the ionic conductivity using, for example, ionic conductivity meters and/or electrochemical impedance data. An ionically conductive passivation material can be beneficial, according to certain embodiments, as it may enhance the transport of ions through the passivation material, which can be useful in enhancing the performance of certain devices (e.g., electrochemical cells such as batteries). According to some embodiments, for example, the passivation material may facilitate the conduction and/or transport of ions (e.g., cations, such as $Ca^{2+}$, and/or anions, such as $F^-$). In certain embodiments, the conduction and/or transport of ions occurs through the bulk of the passivation material. The conduction and/or transport of ions may, in some embodiments, occur through one or more defects in the passivation material.

The passivation material may have any of a variety of suitable ionic conductivities. For example, in certain embodiments, the ionic conductivity (e.g., at a temperature between 20° C. to 25° C.) of the passivation material is greater than or equal to $10^{-15}$ S/cm, greater than or equal to $10^{-4}$ S/cm, greater than or equal to $10^{-3}$ S/cm, greater than or equal to $10^{-12}$ S/cm, greater than or equal to $10^{-11}$ S/cm, greater than or equal to $10^{-10}$ S/cm, greater than or equal to $10^{-9}$ S/cm, or greater than or equal to $10^{-8}$ S/cm. In some embodiments, the ionic conductivity of the passivation material is less than or equal to $10^{-7}$ S/cm, less than or equal to $10^{-8}$ S/cm, less than or equal to $10^{-9}$ S/cm, less than or equal to $10^{-10}$ S/cm, less than or equal to $10^{-11}$ S/cm, less than or equal to $10^{-12}$ S/cm, less than or equal to $10^{-13}$ S/cm, less than or equal to $10^{-14}$ S/cm. Combinations of the above recited ranges are also possible (e.g., the ionic conductivity of the passivation material is greater than or equal to $10^{-15}$ S/cm and less than or equal to $10^{-7}$ S/cm, the ionic conductivity of the passivation material is greater than or equal to $10^{-12}$ S/cm and less than or equal to $10^{-10}$ S/cm). Other ranges are also possible.

In some embodiments, the passivation material may have a substantially high transference number for either the anion or the cation. As used herein, the transference number refers to the fraction of the current transferred by either the cation or the anion in the passivation material per Faraday of charge. Those of ordinary skill in the art would be capable of determining the transference number of a material, and quantifying the transference number, using methods such as, for example, the Hittorf method and/or the moving boundary method.

In certain embodiments, the passivation material has a cationic transference number greater than or equal to 0.1, greater than or equal to 0.2, greater than or equal to 0.3, greater than or equal to 0.4, greater than or equal to 0.5, greater than or equal to 0.6, greater than or equal to 0.7, greater than or equal to 0.8, or greater than or equal to 0.9. In some embodiments, the passivation material has a cationic transference number less than 1, less than or equal to 0.9, less than or equal to 0.8, less than or equal to 0.7, less than or equal to 0.6, less than or equal to 0.5, less than or equal to 0.4, less than or equal to 0.3, or less than or equal to 0.2 Combinations of the above recited ranges are also possible (e.g., the passivation material has a cationic transference number greater than or equal to 0.1 and less than 1, the passivation material has a cationic transference number greater than or equal to 0.5 and less than or equal to 0.7). Other ranges are also possible.

In certain embodiments, the passivation material has an anionic transference number greater than or equal to 0.1, greater than or equal to 0.2, greater than or equal to 0.3, greater than or equal to 0.4, greater than or equal to 0.5, greater than or equal to 0.6, greater than or equal to 0.7, greater than or equal to 0.8, or greater than or equal to 0.9. In some embodiments, the passivation material has an anionic transference number less than 1, less than or equal to 0.9, less than or equal to 0.8, less than or equal to 0.7, less than or equal to 0.6, less than or equal to 0.5, less than or equal to 0.4, less than or equal to 0.3, or less than or equal to 0.2 Combinations of the above recited ranges are also possible (e.g., the passivation material has an anionic transference number greater than or equal to 0.1 and less than 1, the passivation material has an anionic transference number greater than or equal to 0.5 and less than or equal to 0.7). Other ranges are also possible.

In certain embodiments, the passivation material is electronically insulating. Those of ordinary skill in the art would be familiar with electronically insulating materials, which are materials that have the ability to restrict the flow of electrons such that electrons are not transported through the material to a substantial degree. In some embodiments, the electronically insulating passivation material has a resistivity (e.g., at a temperature between 20° C. to 25° C.) less than or equal to $10^{15}$ ohm-cm, less than or equal to $10^{14}$ ohm-cm, less than or equal to $10^{13}$ ohm-cm, or less than or equal to $10^{12}$ ohm-cm. In some embodiments, the resistivity of the passivation material is greater than or equal to $10^{11}$ ohm-cm, greater than or equal to $10^{12}$ ohm-cm, greater than or equal to $10^{13}$ ohm-cm, greater than or equal to $10^{14}$ ohm-cm. Combinations of the above recited ranges are also possible (e.g., the resistivity of the passivation material is less than or equal to $10^{15}$ ohm-cm and greater than or equal to $10^{11}$ ohm-cm, the resistivity of the passivation material is less than or equal to $10^{14}$ ohm-cm and greater than or equal to $10^{12}$ ohm-cm). Other ranges are also possible. Those of ordinary skill in the art would be capable of determining whether a material is electronically insulating, and quantifying the degree of its electronic insulation, by making resistance measurements using, for example, Ohm's Law. Other methods of measuring resistivity include using probe instruments, such as a 4-point probe.

According to certain embodiments, the passivation material (e.g., passivation layer) may have any of a variety of suitable thicknesses. For example, in some embodiments, the passivation material has an average thickness less than or equal to 200 micrometers, less than or equal to 150 micrometers, less than or equal to 100 micrometers, less than or equal to 50 micrometers, less than or equal to 25 micrometers, less than or equal to 20 micrometers, less than or equal to 10 micrometers, less than or equal to 5 micrometers, less than or equal to 1 micrometer, less than or equal to 0.9 micrometers, less than or equal to 0.8 micrometers, less than or equal to 0.7 micrometers, less than or equal to 0.6 micrometers, less than or equal to 0.5 micrometers, less than or equal to 0.4 micrometers, less than or equal to 0.3 micrometers, less than or equal to 0.2 micrometers, less than or equal to 0.1 micrometers, less than or equal to 0.09 micrometers, less than or equal to 0.08 micrometers, less than or equal to 0.07 micrometers, less than or equal to 0.06 micrometers, less than or equal to 0.05 micrometers, less than or equal to 0.04 micrometers, less than or equal to 0.03 micrometers, or less than or equal to 0.02 micrometers. In certain embodiments, the passivation material has an average thickness greater than or equal to 0.01 micrometers, greater than or equal to 0.02 micrometers, greater than or equal to 0.03 micrometers, greater than or equal to 0.04 micrometers, greater than or equal to 0.05 micrometers, greater than or equal to 0.06 micrometers, greater than or equal to 0.07 micrometers, greater than or equal to 0.08 micrometers, greater than or equal to 0.09 micrometers, greater than or equal to 0.1 micrometers, greater than or equal to 0.2 micrometers, greater than or equal to 0.3 micrometers, greater than or equal to 0.4 micrometers, greater than or equal to 0.5 micrometers, greater than or equal to 0.6 micrometers, greater than or equal to 0.7 micrometers, greater than or equal to 0.8 micrometers, greater than or equal to 0.9 micrometers, greater than or equal to 1 micrometer, greater than or equal to 5 micrometers, greater than or equal to 10 micrometers, greater than or equal to 20 micrometers, greater than or equal to 25 micrometers, greater than or equal to 50 micrometers, greater than or equal to 100 micrometers, greater than or equal to 150 micrometers. Combinations of the above recited ranges are also possible (e.g., the passivation material has an average thickness less than or equal to 200 micrometers and greater than or equal to 0.01 micrometers, the passivation material has an average thickness less than or equal to 0.6 micrometers and greater than or equal to 0.3 micrometers). Other ranges are also possible. The thickness of the passivation material may be determined using XPS (e.g., XPS depth profiling), SEM, and/or TEM.

The passivation material may comprise a substantially small amount of contaminants, as compared to a passivation material that is formed by conventional methods (e.g., solvent immersion and co-reduction techniques). Conventional passivation materials may comprise contaminants such as sulfur, carbon, hydrogen, and/or oxygen, though other contaminants are possible. In some embodiments, for example, the contaminant may comprise an electrolyte and/or solvent derived contaminant, such as a solvent and/or electrolyte reduction product (e.g., a carbonate, an alkoxide, and/or a non-conducting polymer).

In some embodiments the contaminant sulfur in the passivation material does not include the amount of sulfur from the sulfide of the alkaline earth sulfide (e.g., CaS, MgS), which is formed by reacting the substrate comprising the alkaline earth metal (e.g., Ca, Mg) with a gas (e.g., SR), as is explained herein in greater detail. In some embodiments, the amount of contaminant sulfur in the passivation material is determined when the passivation material comprises an alkaline earth fluoride (e.g., $CaF_2$, $MgF_2$).

According to certain embodiments, the amount of contaminants in the passivation material may be measured at a certain depth of the passivation material (e.g., at a depth of 0.01 micrometers, at depth of 0.1 micrometers, at a depth of 0.2 micrometers, at a depth of 0.5 micrometers etc.). For example, as shown in FIG. 1, in some embodiments the amount of contaminants in passivation material 104 may be measured at depth 202. In some embodiments, the amount of contaminants in the passivation material is not dependent on the depth of which the contaminants are measured. For example, in certain non-limiting embodiments, the amount of contaminants in the passivation material at a first depth (e.g., 0.01 micrometers) does not vary substantially from the amount of contaminants in the passivation material at a second depth that is different from the first depth (e.g., 0.5 micrometers).

In certain embodiments, the amount of contaminants (e.g., sulfur, carbon, hydrogen, and/or oxygen) in the passivation material measured at a depth up to 1 micrometer may be substantially low. In some embodiments, for example, the amount of contaminants in the passivation material at a depth up to 1 micrometer is less than or equal to 10 mol. %, less than or equal to 7 mol. %, less than or equal to 6 mol. %, less than or equal to 5 mol. %, less than or equal to 4 mol. %, less than or equal to 3 mol. %, less than or equal to 2 mol. %, less than or equal to 1 mol. %, less than or equal to 0.5 mol. %, or less than or equal to 0.1 mol. % based on the total number of moles of the passivation material. In certain embodiments, the amount of contaminants in the passivation material at a depth up to 1 micrometer is greater than or equal to 0.01 mol. %, greater than or equal to 0.1 mol. %, greater than or equal to 0.5 mol. %, greater than or equal to 1 mol. %, greater than or equal to 2 mol. %, greater than or equal to 3 mol. %, greater than or equal to 4 mol. %, greater than or equal to 5 mol. %, greater than or equal to 6 mol. %, or greater than or equal to 7 mol. % based on the total number of moles in the passivation material. Combinations of the above recited ranges are also possible (e.g., the amount of contaminants in the passivation material at depth up to 1 micrometer is less than or equal to 10 mol. % and greater than or equal to 0.01 mol. % based on the total number of moles of the passivation material, the amount of contaminants in the passivation material at a depth up to 1 micrometer is less than or equal to 5 mol. % and greater than or equal to 3 mol. % based on the total number of moles of the passivation material). Other ranges are also possible. The amount of contaminants in the passivation material (e.g., at a depth up to 1 micrometer) may be determined by XPS, SEM (e.g., coupled with energy-dispersive X-ray spectroscopy), and/or TEM (e.g., coupled with electron energy loss spectroscopy).

In some embodiments, the amount of contaminants may be measured at the surface of the passivation material. For example, referring to FIG. 1, the amount of contaminants in passivation material 102 may be measured at surface 204. In certain embodiments, the amount of contaminants (e.g., sulfur, carbon, hydrogen, oxygen, an electrolyte and/or solvent derived contaminant) at the surface of the passivation material may be substantially low. According to certain embodiments, for example, the amount of contaminants at the surface of the passivation material is less than or equal to 15 mol. %, less than or equal to 10 mol. %, less than or equal to 5 mol. %, less than or equal to 4 mol. %, less than or equal to 3 mol. %, less than or equal to 2 mol. %, less than or equal to 1.5 mol. %, less than or equal to 1 mol. %, less than or equal to 0.5 mol. %, or less than or equal to 0.1 mol. % based on the total number of moles in the passivation material. In some embodiments, the amount of contaminants at the surface of the passivation material is greater than or equal to 0.01 mol. %, greater than or equal to 0.1 mol. %, greater than or equal to 0.5 mol. %, greater than or equal to 1 mol %, greater than or equal to 1.5 mol. %, greater than or equal to 2 mol. %, greater than or equal to 3 mol. %, greater than or equal to 4 mol. %, greater than or equal to 5 mol. %, or greater than or equal to 10 mol. % based on the total number of moles in the passivation material. Combinations of the above recited ranges are also possible (e.g., the amount of contaminants at the surface of the passivation material is less than or equal to 15 mol. % and greater than or equal to 0.01 mol. % based on the total number of moles in the passivation material, the amount of contaminants at the surface of the passivation material is less than or equal to 1 mol. % and greater than or equal to 0.5 mol. % based on the total number of moles in the passivation material). Other ranges are also possible. The amount of contaminants at the surface of the passivation material may be determined by XPS, SEM (e.g., coupled with energy-dispersive X-ray spectroscopy), and/or TEM (e.g., coupled with electron energy loss spectroscopy).

According to certain embodiments, the passivation material is conformal to the substrate. In some embodiments, for example, the passivation material comprises a substantially small amount of defects (e.g., less than or equal to 20 defects per $mm^2$ of passivation material and greater than or equal to 1 defect per $mm^2$ of passivation material). In certain embodiments, one or more defects are observable to the human eye (e.g., with or without the use of microscopic techniques). An example of a defect includes, in certain embodiments, a crack in the passivation material, though other defects are possible, and the shape and/or size of the defect may be non-limiting as long as the defect is detectable. For example, in certain embodiments, the defect may have a maximum dimension of greater than or equal to 1 micrometer, greater than or equal to 2 micrometers, greater than or equal to 5 micrometers, greater than or equal to 10 micrometers, greater than or equal to 20 micrometers, or greater than or equal to 50 micrometers. A passivation material substantially free from defects (e.g., cracks) may be advantageous, because it allows for ions (e.g., $Ca^{2+}$ cations, $F^-$ anions) to diffuse through the passivation material homogenously and at similar rates. Resultantly, the overall performance (e.g., ionic conductivity) of the article may be improved, as the transport of ions through the bulk of the passivation material may enhance the transport of ions in the electrochemical cell (e.g., battery).

In some embodiments, at least a portion of the passivation material is non-conformal. For example, in certain embodiments, the passivation material may intentionally comprise one or more defects (e.g., cracks). It may be beneficial, in some embodiments, for at least a portion of the passivation material to be non-conformal to intentionally form an 'outer' domain comprising organic components on the passivation material, depending on the use of the article (e.g., electrode). Such organic components may be co-reduction products from the electrolyte and/or solvent of the electrochemical cell, in some embodiments.

Certain embodiments described herein are related to a method of forming a passivation material. In some embodiments, the passivation material may be formed on a substrate. As explained herein, in some embodiments, the substrate comprises an alkaline earth metal. For example, in certain embodiments, the substrate comprises Ca or Mg. In some embodiments, the substrate is at least partially in the form of a two-dimensional structure, such as a layer and/or a sheet (e.g., an alkaline earth metal layer). In certain embodiments, the substrate is at least partially in the form of a three-dimensional structure (e.g. a coordination cage, a covalent organic framework, a nanostructure). In some such embodiments, the alkaline earth metal (e.g., Ca) may be wicked into at least a portion of the three-dimensional structure. In certain embodiments, the three-dimensional structure may comprise a carbon framework (e.g., graphite or graphene).

Figure 2:
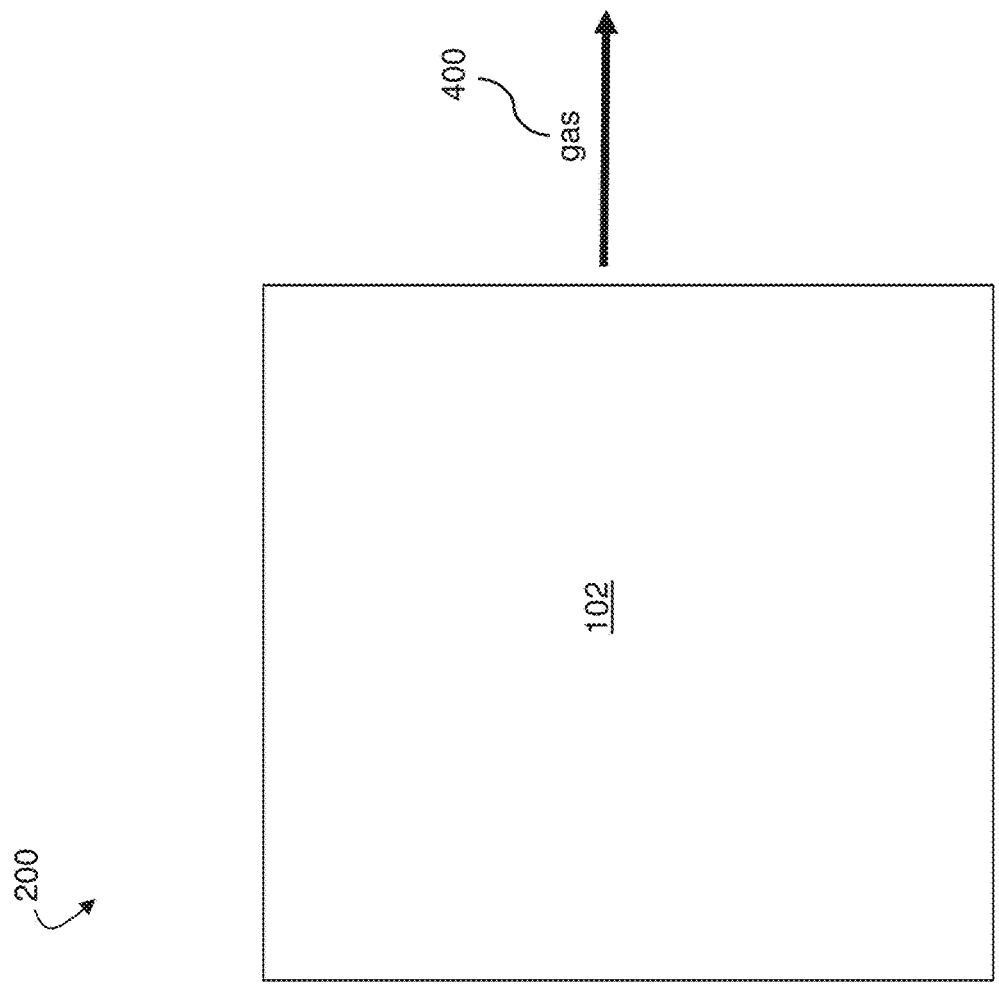
FIG. 2 shows, in accordance with certain embodiments, a method for forming a passivation material.
Figure 3A:
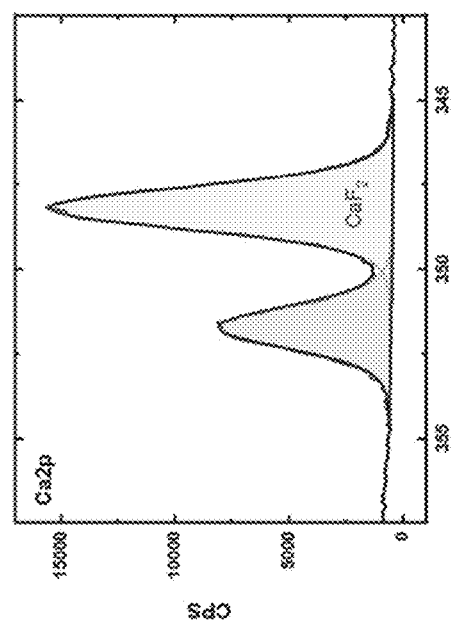
FIG. 3A shows, in accordance with certain embodiments, a Ca 2p X-ray photoelectron spectroscopy (XPS) spectrum of a Ca substrate reacted with nitrogen trifluoride ($NF_3$)
Figure 3B:
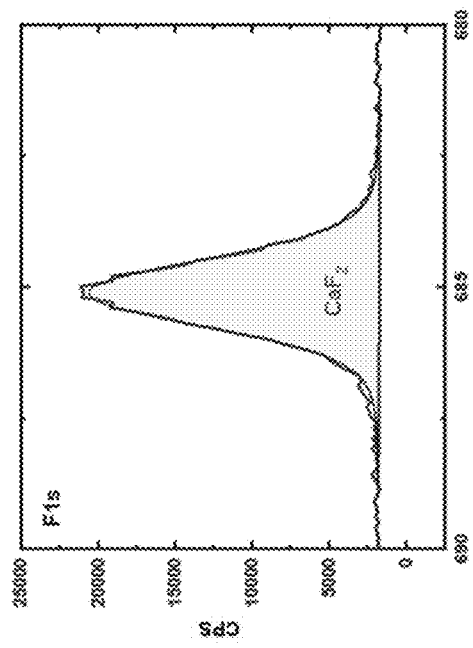
FIG. 3B shows, in accordance with certain embodiments, a F 1s XPS spectrum of a Ca substrate reacted with $NF_3$.
Figure 3C:
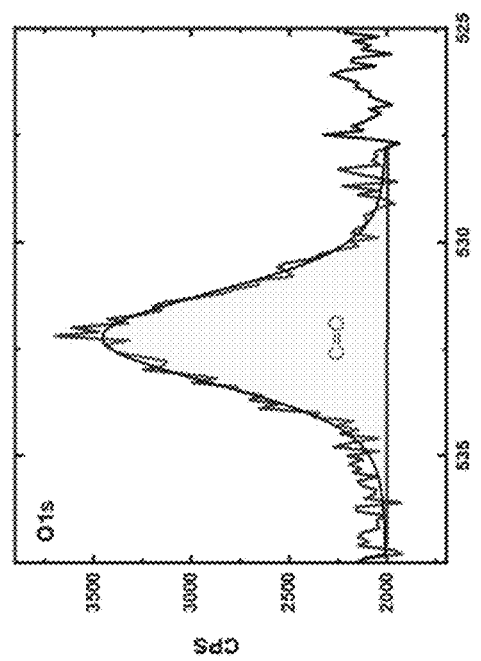
FIG. 3C shows, in accordance with certain embodiments, a O 1s XPS spectrum of a Ca substrate reacted with $NF_3$.
Figure 3D:
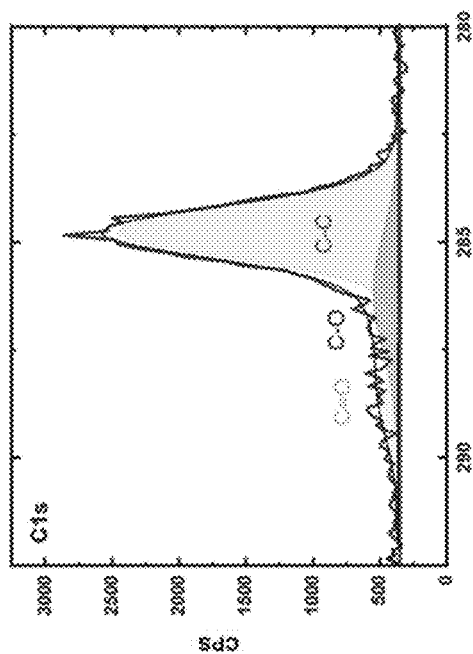
FIG. 3D shows, in accordance with certain embodiments, a C 1s XPS spectrum of a Ca substrate reacted with $NF_3$.

In certain embodiments, the method comprises reacting a substrate comprising an alkaline earth metal with a gas and forming a passivation material on at least a portion of the substrate. FIG. 2 shows, in accordance with certain embodiments, a method for forming a passivation material. As shown in FIG. 2, method 200 comprises reacting substrate 102 comprising an alkaline earth metal with gas 400 and forming passivation material 104 on at least a portion of substrate 102. In certain embodiments, reacting is performed in a reactor, such as, for example, a stainless steel reactor. In some embodiments, the gas is purged into the reactor at a predetermined temperature and/or pressure, and/or for a predetermined reaction time. According to some embodiments, certain reaction conditions, such as the temperature and/or reaction time, may be adjusted in order to alter the thickness and/or homogeneity of the passivation material on the substrate.

In some embodiments, the gas is an inorganic gas. In certain embodiments, the gas may be in the form of a vapor. In certain embodiments, the gas is or comprises nitrogen trifluoride ($NF_3$), sulfur hexafluoride ($SF_6$), octasulfur ($S_8$), dinitrogen ($N_2$), carbon tetrafluoride ($CF_4$), and/or mixtures thereof. In some embodiments, the gas is or comprises a hexafluoride gas (e.g., $AF_6$, where A=Se, Te, Xe, and the like). In some embodiments, the gas is or comprises a chlorofluorocarbon (CFC) and/or a hydrochlorofluorocarbon (HCFC).

In certain embodiments wherein $NF_3$ and/or $SF_6$ is used as the gas, the passivation material comprises $AF_2$, wherein A is an alkaline earth metal (e.g., Ca or Mg). In some such embodiments, the passivation material may comprise $AF_2$ in an amount greater than or equal to 75 mol. %, 85 mol. %, 90 mol. %, 95 mol. %, or 99 mol. % based on the total number of moles in the passivation material. In certain embodiments, when $S_8$ is used as the gas, the passivation material comprises AS, wherein A is an alkaline earth metal (e.g., Ca or Mg). In some such embodiments, the passivation material may comprise AO in an amount greater than or equal to 75 mol. %, 85 mol. %, 90 mol. %, 95 mol. %, or 99 mol. % based on the total number of moles in the passivation material.

In certain embodiments, the substrate comprising an alkaline earth metals is reacted with the gas at any of a variety of suitable temperatures. An increased reaction temperature may, in some embodiments, increase the thickness (e.g., average thickness) of the passivation material. In some embodiments, reacting is performed at a temperature greater than or equal to about 50° C., greater than or equal to about 75° C., greater than or equal to 100° C., greater than or equal to 125° C., greater than or equal to 150° C., greater than or equal to 175° C., greater than or equal to 200° C., greater than or equal to 225° C., greater than or equal to 250° C., or greater than or equal to 275° C. In some embodiments, reacting is performed at a temperature of less than or equal to 300° C., less than or equal to 275° C., less than or equal to 250° C., less than or equal to 225° C., less than or equal to 200° C., less than or equal to 175° C., less than or equal to 150° C., less than or equal to 125° C., less than or equal to 100° C., or less than or equal to about 75° C. Combinations of the above recited ranges are also possible (e.g., reacting is performed at a temperature between greater than or equal to about 50° C. and less than or equal to about 300° C., reacting is performed at a temperature between greater than or equal to about 200° C. and less than or equal to about 250° C.). Other ranges are also possible.

The substrate comprising an alkaline earth metals may be reacted with the gas for any of a variety of suitable times. An increased reaction time may, in some embodiments, increase the thickness (e.g., average thickness) of the passivation material. In some embodiments, reacting is performed for greater than or equal to 10 minutes, greater than or equal to 15 minutes, greater than or equal to 20 minutes, greater than or equal to 30 minutes, greater than or equal to 45 minutes, greater than or equal to 1 hour, greater than or equal to 2 hours, greater than or equal to 5 hours, greater than or equal to 12 hours, greater than or equal to 24 hours, greater than or equal to 36 hours, greater than or equal to 48 hours, or greater than or equal to 60 hours. In certain embodiments, reacting is performed for less than or equal to 72 hours, less than or equal to 60 hours, less than or equal to 48 hours, less than or equal to 36 hours, less than or equal to 48 hours, or less than or equal to 36 hours, less than or equal to 24 hours, less than or equal to 12 hours, less than or equal to 5 hours, less than or equal to 2 hours, less than or equal to 1 hour, less than or equal to 45 minutes, less than or equal to 30 minutes, less than or equal to 20 minutes, or less than or equal to 15 minutes. Combinations of the above recited ranges are also possible (e.g., reacting is performed for greater than or equal to 15 minutes and less than or equal to 72 hours, reacting is performed for greater than or equal to 36 hours and less than or equal to 60 hours). Other ranges are also possible.

The substrate comprising an alkali metals may be reacted with the gas at any of a variety of suitable pressures. For example, in certain embodiments, reacting is performed at about standard atmospheric pressure (e.g., 1 atmosphere). In some embodiments, reacting is performed at greater than standard atmospheric pressure. For example, in certain embodiments, reacting is performed at greater than 1 atmosphere, greater than or equal to 1.2 atmospheres, greater than or equal to 1.4 atmospheres, greater than or equal to 1.6 atmospheres, or greater than or equal to 1.8 atmospheres. In some embodiments, reacting is performed at less than or equal to 2 atmospheres, less than or equal to 1.8 atmospheres, less than or equal to 1.6 atmospheres, less than or equal to 1.4 atmospheres, or less than or equal to 1.2 atmospheres. Combinations of the above recited ranges are also possible (e.g., reacting is performed at greater than or equal to 1 atmosphere and less than or equal to 2 atmospheres, reacting is performed at greater than or equal to 1.4 atmospheres and less than or equal to 1.6 atmospheres). Other ranges are also possible.

According to certain embodiments, after forming the first passivation material on at least a portion of the substrate, the method may further comprise reacting the substrate with a second gas to form a second passivation material. In some such embodiments, the second gas used to form the second passivation material may be the same of different than the first gas used to form the first passivation material. In certain embodiments, the second passivation material may be at least partially in direct contact with the substrate and/or the first passivation material. For example, in certain non-limiting embodiments, the first passivation material is in direct contact with the alkaline earth metal substrate, and the second passivation material is in direct contact with the first passivation material. In certain embodiments, the first passivation material comprises a first alkaline earth ionic compound, and the second passivation material comprises a second alkaline earth ionic compound that is different from the first alkaline earth ionic compound.

In some embodiments, the article (e.g., electrode) is used in an electrochemical cell. According to some such embodiments, the electrochemical cell may be a rechargeable battery or a non-rechargeable battery. In some embodiments, the battery (e.g., rechargeable battery) may be used in portable applications, transportation applications, (e.g., electric vehicles), space and/or military applications, and/or grid-storage applications (e.g., electrical power grids for the storage of renewable energy).

As noted above, in certain embodiments, the electrochemical cell comprises one or more electrodes. For example, in certain embodiments, the electrochemical cell comprises an anode and a cathode. In some embodiments, the electrodes may comprise one or more binder materials (e.g., polymers, etc.).

The anode may comprise a variety of anode active materials. As used herein, the term "anode active material" refers to any electrochemically active species associated with the anode. In some embodiments, the anode active material is an alkaline earth metal, such as Ca or Mg. In certain embodiments, the anode active material is an alkaline earth metal alloy. While these materials may be preferred in some embodiments, other cell chemistries are also contemplated.

In some embodiments, the anode may have a thickness of less than or equal to 1500 micrometers, less than or equal to 1250 micrometers, less than or equal to 1000 micrometers, less than or equal to 750 micrometers, less than or equal to 500 micrometers, or less than or equal to 200 micrometers. In certain embodiments, the anode may have a thickness of at least 1 micrometer, at least 5 micrometers, at least 10 micrometers, at least 25 micrometers, at least 50 micrometers, at least 100 micrometers, or at least 150 micrometers. Combinations of the above-referenced ranges are also possible (e.g., from 1 micrometer to 1500 micrometers). Other ranges are also possible.

The cathode may comprise a variety of cathode active materials. As used herein, the term "cathode active material" refers to any electrochemically active species associated with the cathode. In some embodiments, the cathode active material comprises sulfur or oxygen. In certain embodiments, the cathode active material comprise an alkaline earth (e.g., a $Ca^{21}$) intercalation material. In some embodiments, the cathode active material comprises a metal fluoride.

In some embodiments, the cathode may have a thickness of less than or equal to 2000 micrometers, less than or equal to 1500 micrometers, less than or equal to 1250 micrometers, less than or equal to 1000 micrometers, less than or equal to 750 micrometers, less than or equal to 500 micrometers, or less than or equal to 200 micrometers. In certain embodiments, the cathode may have a thickness of at least 1 micrometer, at least 5 micrometers, at least 10 micrometers, at least 25 micrometers, at least 50 micrometers, at least 100 micrometers, or at least 150 micrometers. Combinations of the above-referenced ranges are also possible (e.g., from 1 micrometer to 2000 micrometers). Other ranges are also possible.

According to some embodiments, the electrochemical cell comprises an electrolyte. The electrolytes used in electrochemical cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions between the anode and the cathode. The electrolyte is generally electronically non-conductive to prevent short circuiting between the anode and the cathode. The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes.

In some cases, the electrochemical chemical cell comprises a liquid electrolyte. In some embodiments, the electrolyte includes a non-aqueous electrolyte. Suitable non-aqueous electrolytes may include organic electrolytes such as liquid electrolytes, gel polymer electrolytes, and solid polymer electrolytes. These electrolytes may optionally include one or more ionic electrolyte salts (e.g., to provide or enhance ionic conductivity). Examples of useful non-aqueous liquid electrolyte solvents include, but are not limited to, non-aqueous organic solvents, such as, for example, N-methyl acetamide, acetonitrile, acetals, ketals, esters (e.g., esters of carbonic acid), carbonates (e.g., dimethyl carbonate, diethyl carbonate, ethyl methyl carbonate, propylene carbonate, ethylene carbonate, fluoroethylene carbonate, difluoroethylene carbonate), sulfones, sulfites, sulfolanes, suflonimidies (e.g., bis(trifluoromethane)sulfonimide lithium salt), aliphatic ethers, acyclic ethers, cyclic ethers, glymes, polyethers, phosphate esters (e.g., hexafluorophosphate), siloxanes, dioxolanes, N-alkylpyrrolidones, nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. In some cases, mixtures of the solvents described herein may also be used.

In some cases, aqueous solvents can be used for electrolytes for electrochemical cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

In certain embodiments, the electrochemical cell comprises gel electrolyte. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

According to certain embodiments, the electrochemical cell comprises solid electrolyte. For example, in some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

In some embodiments, an electrochemical cell includes a separator. The separator generally comprises a polymeric material (e.g., polymeric material that does or does not swell upon exposure to electrolyte). In some embodiments, the separator is located between the electrolyte and an electrode (e.g., a first electrode, a second electrode, an anode, a cathode). The separator can be configured to inhibit (e.g., prevent) physical contact between a first electrode and a second electrode, which could result in short circuiting of the electrochemical cell. The separator can be configured to be substantially electronically non-conductive, which can inhibit the degree to which the separator causes short circuiting of the electrochemical cell.

Example 1

Figure 4A:
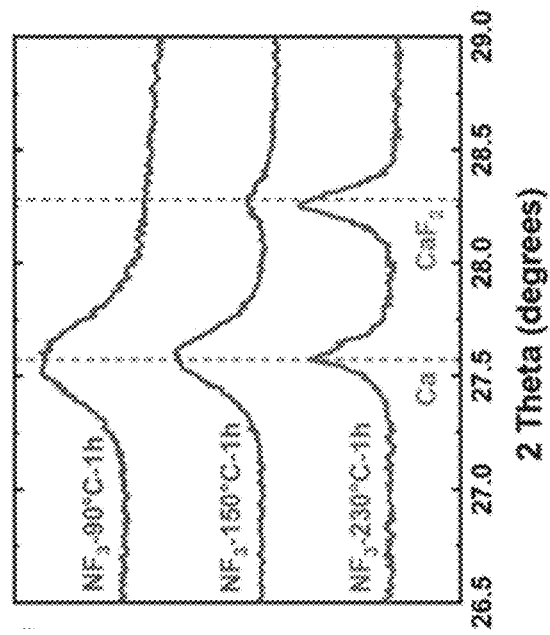
FIG. 4A shows, in accordance with certain embodiments, a X-ray powder diffraction (XRD) spectrum of a $CaF_2$ film formed by reacting a Ca substrate reacted with $NF_3$.
Figure 4B:
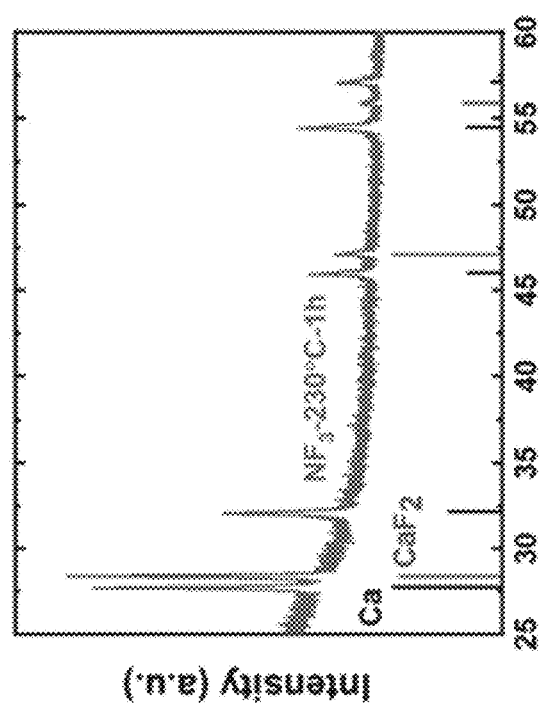
FIG. 4B shows, in accordance with certain embodiments, $Ca/CaF_2$ peak ratios for three different reaction conditions.

The following example describes the formation of a passivation material comprising $CaF_2$ by reacting a Ca substrate with nitrogen trifluoride gas ($NF_3$). The Ca substrate was prepared for target reactions in an argon glovebox, using mechanical polishing to remove any oxides present on the surface of the substrate. The Ca substrate was then cut or punched to a predetermined size and loaded into an airtight reaction vessel under an inert argon environment. The vessel was purged with $NF_3$ and heated to 230° C. for 48 hours. Following the reaction, the vessel and contents were cooled, then purged with argon to remove the reactant gas prior to opening. The resulting passivation films were found by XPS, as shown in FIGS. 3A-3D, to contain $CaF_2$ and no significant quantities of $Ca_3N_2$, which indicates that the evolved nitrogen during reaction is non-reactive towards the substrate and appears to escape as a gaseous product. XRD indicated that the $CaF_2$ passivation film was crystalline and relatively thin, such that the base metal Ca signal is still significant, as shown in FIGS. 4A-4B.

Figure 5:
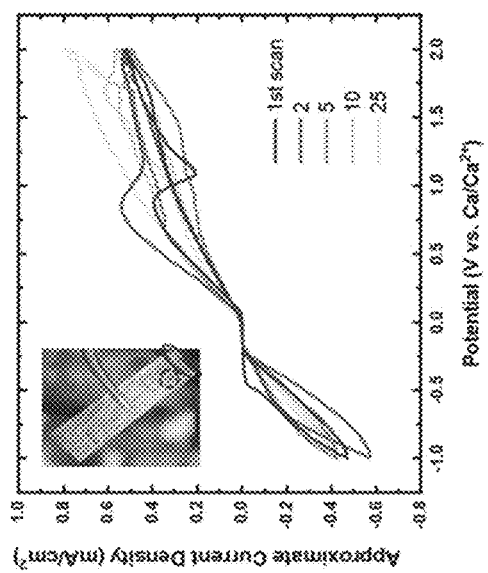
FIG. 5 shows, in accordance with certain embodiments, cyclic voltammetry (CV) of a working electrode comprising Ca passivated with a film of $CaF_2$.
Figure 6B:
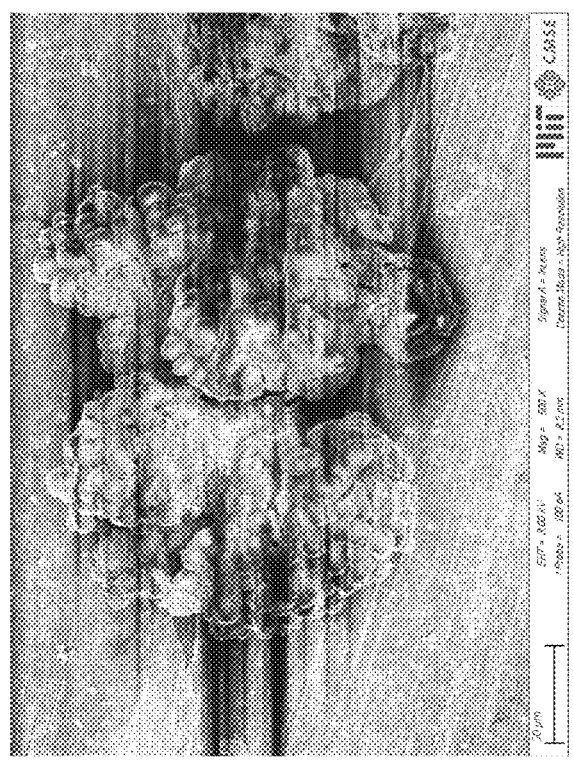
FIG. 6B shows, in accordance with certain embodiments, a SEM image of a deposited Ca nodule on a $CaF_2$ passivation film.
Figure 6A:
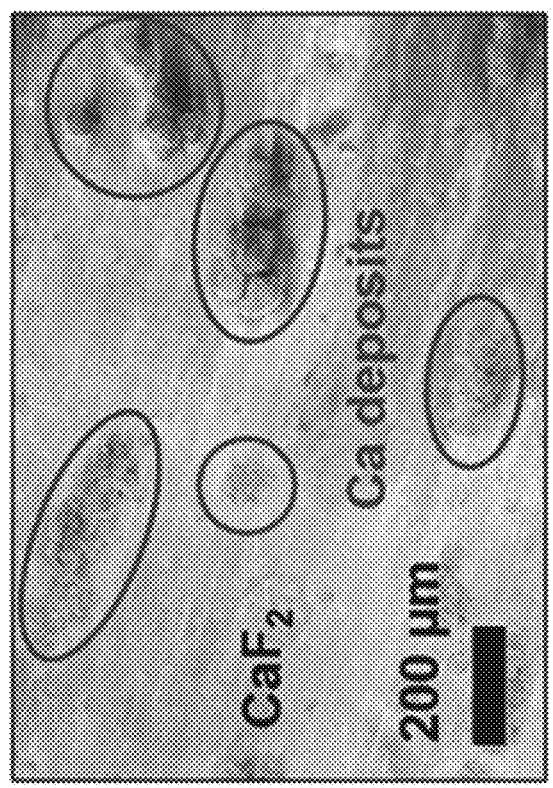
FIG. 6A shows, in accordance with certain embodiments, a scanning electron microscopy (SEM) image of multiple Ca deposits separated by areas of intact $CaF_2$.
Figure 7A:
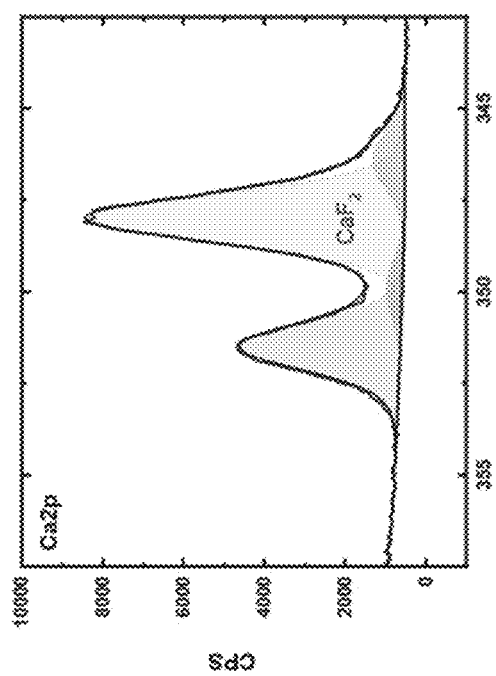
FIG. 7A shows, in accordance with certain embodiments, a Ca 2p XPS spectrum of a Ca substrate reacted with sulfur hexafluoride ($SF_6$)
Figure 7B:
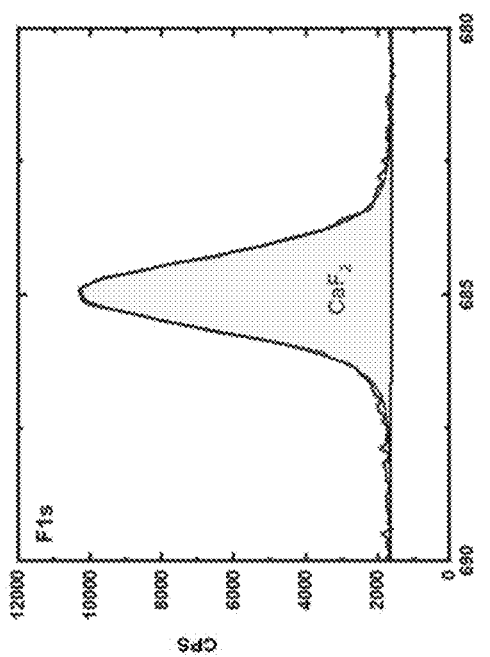
FIG. 7B shows, in accordance with certain embodiments, a F 1s XPS spectrum of a Ca substrate reacted with $SF_6$.
Figure 7C:
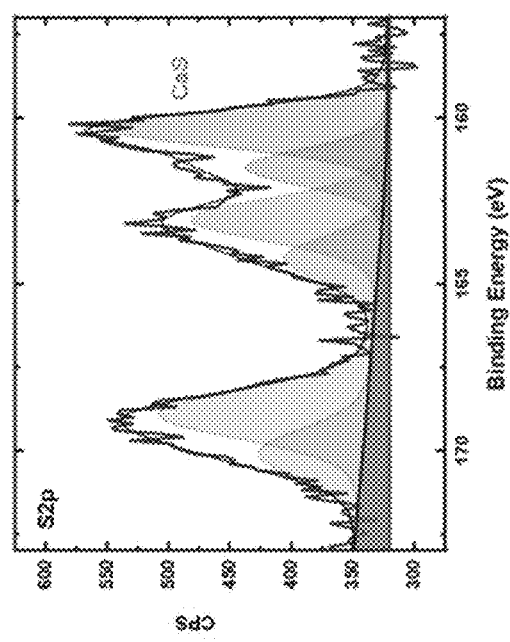
FIG. 7C shows, in accordance with certain embodiments, a S 2p XPS spectrum of a Ca substrate reacted with $SF_6$.
Figure 7D:
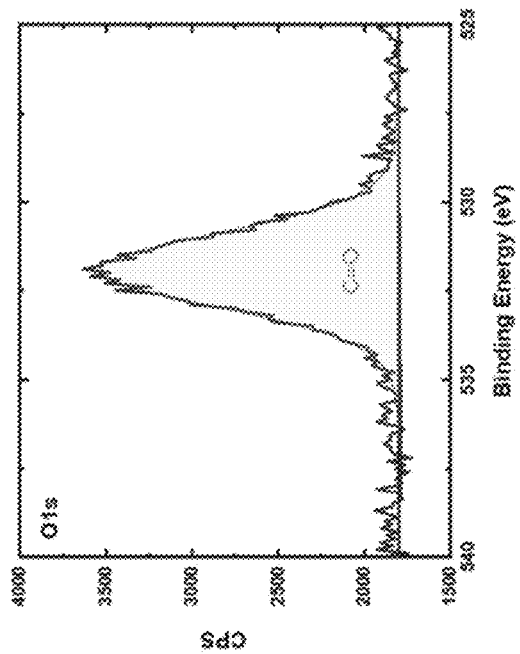
FIG. 7D shows, in accordance with certain embodiments, a O 1s XPS spectrum of a Ca substrate reacted with $SF_6$.
Figure 7E:
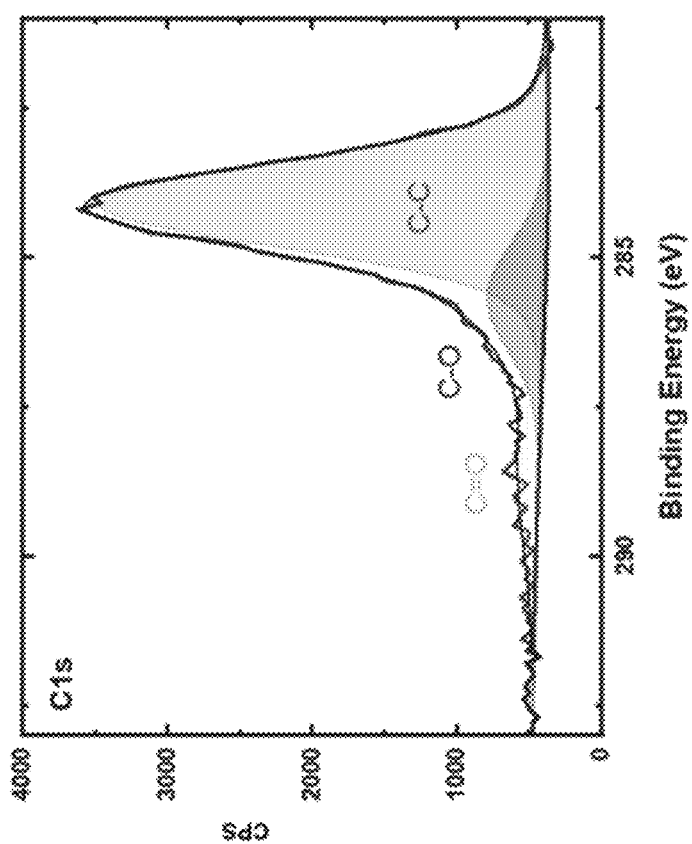
FIG. 7E shows, in accordance with certain embodiments, a C 1s XPS spectrum of a Ca substrate reacted with $SF_6$.

To test the electrochemical behavior of the passivation film, cyclic voltammetry measurements were conducted in which a constant sweep rate (typically 25 mV/s) was applied to the $CaF_2$-covered Ca working electrode, as shown in FIG. 5). The electrolyte was 1.5 M $Ca(BH_4)_2$ in tetrahydrofuran and the reference and counter electrodes were Ca and Pt, respectively. The cathodic currents in each scan indicate the deposition of Ca onto the working electrode. These Ca deposits are then stripped away during the oxidative currents. During the oxidative scan of the $1^{st}$ cycle in FIG. 5, the position of the local minimum corresponds to a charge efficiency of 75.8%, indicating that 75.8% of the plated Ca has been stripped away. It is cautioned that this charge efficiency value should not be interpreted as Coulombic efficiency because of the large amount of underlying Ca and thus dissimilarity of the measurement conditions from those typically used for Coulombic efficiency quantification. The local minimum during the $2^{nd}$ cycle corresponds to 91.5%. Post-mortem SEM images on the working electrode identify Ca nodules (scale: tens of micrometers) in size, as shown in FIGS. 6A-6B.

Example 2

Figure 8:
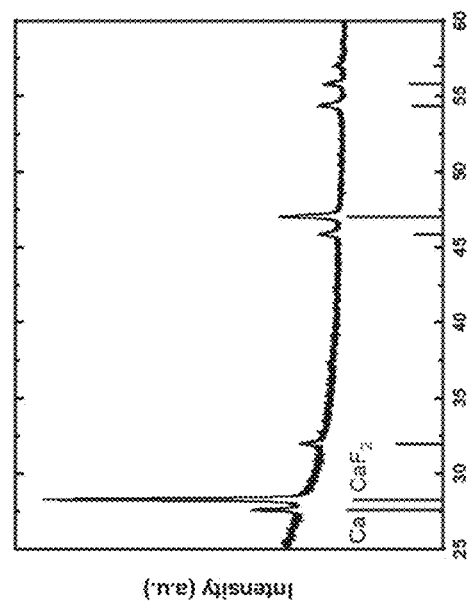
FIG. 8 shows, in accordance with certain embodiments, a XRD spectrum of a Ca substrate reacted with $SF_6$.

The following example describes the formation of a passivation material comprising $CaF_2$ by reacting a Ca substrate with sulfur hexafluoride gas. The Ca substrate was prepared for target reactions in an argon glovebox, using mechanical polishing to remove any oxides present on the surface of the substrate. The Ca substrate was then cut or punched to a predetermined size and loaded into an airtight reaction vessel under an inert argon environment. The vessel was purged with $SF_6$ and heated to 225° C. for 48 hours. Following the reaction, the vessel and contents were cooled, then purged with argon to remove the reactant gas prior to opening. As shown in FIGS. 7A-7E, XPS results indicated the formation of $CaF_2$ and small amounts of S-containing compounds (possibly including a metal sulfide, indicated as CaS) on the surface of the film. XRD results indicate crystalline $CaF_2$ over the base Ca, as shown in FIG. 8.

Example 3

Figure 9:
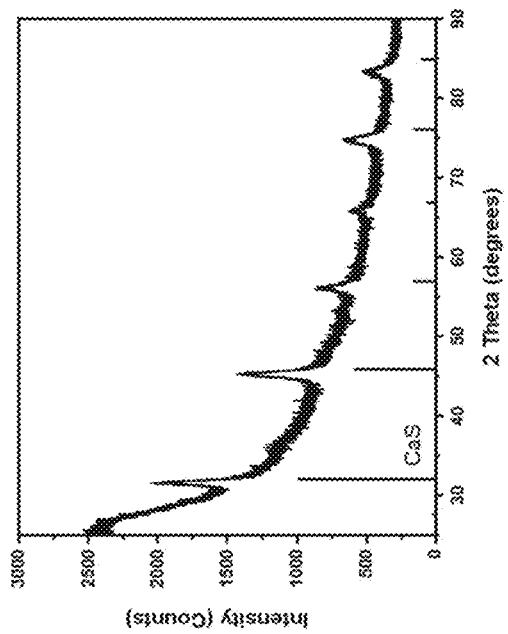
FIG. 9 shows, in accordance with certain embodiments, a XRD spectrum of a Ca substrate reacted with sulfur vapor from melted octasulfur ($S_8$)

The following example describes the formation of a passivation material comprising CaS by reacting a Ca substrate with vapor obtained from melted $S_8$. The Ca substrate was prepared for target reactions in an argon glovebox, using mechanical polishing to remove any oxides present on the surface of the substrate. The vessel was loaded with $S_8$, and the Ca substrate was then cut or punched to a predetermined size and placed on a mesh suspended above the $S_8$. The vessel was heated to at least partially melt the $S_8$ and form sulfur vapor resulting from the liquid sulfur's vapor pressure. The Ca substrate reacted with the sulfur vapor at 160° C. for 50 hours. Following the reaction, the vessel and contents were cooled, then purged with argon to remove the reactant gas prior to opening. XRD results indicated that crystalline CaS formed in a thick layer, as shown in FIG. 9. The CaS passivation film can be scratched off to reveal metallic Ca underneath.

Example 4

The following example describes the electrochemical effects that several different interfaces—pre-existing interfaces on processed Ca foil, electrolyte-derived native SEI, and synthetic inorganic surface films—have on Ca metal foil anodes. This study investigated, first, a look into the preparation of Ca foil for practical use in order to compare morphologically- and compositionally-consistent electrode surfaces. For electrochemical measurements, 1.5 M $Ca(BH_4)_2$/THF was utilized as the baseline electrolyte; the native $CaH_2$ SEI that this electrolyte forms on Ca chemically evolves over time. This allowed a controlled look into the effects that cell rest, which invites increases in presumed $CaH_2$ thickness, has on subsequent electrochemistry. $CaF_2$ was chosen as the synthetic surface film due to its relevance in Ca SEI phases. Note that $CaF_2$ has been postulated to be an anion conductor, whereas $CaH_2$, which was also thought to be an anion conductor, has been suggested to have a lower $Ca^2$ migration energy barrier than $CaF_2$, which could allow some degree of cation transport. Thus, this study also includes a first assessment into the ability of modified SEIs to influence Ca electrochemistry, which would provide a possibly interesting engineering strategy for exploring the use of Ca metal in batteries. Overall, this work shows that as reversible Ca plating/stripping is unlocked in emerging electrolyte systems, the electrochemistry is increasingly limited by addressable concerns such as preparation methodologies and history of Ca foil interfaces.

Preparation of Calcium Electrodes: Ca electrode preparation was conducted inside an argon glovebox ($H_2O$ content <0.1 ppm, 02 content <0.1 ppm, MBRAUN). Two methodologies were investigated: (1) pressing of Ca dendritic pieces and (2) polishing of pre-rolled Ca sheets. For (1), Ca dendrites (99.99/6 pure, shipped under Ar, Sigma Aldrich) were simply flattened with a manual mechanical press between plastic sheets. For (2), pre-rolled Ca sheets (99.9% pure, 0.25 mm thick, shipped in mineral oil, ACI Alloys) were cleaned and then mechanically polished in a three step process using a Dremel® grinder with a silicon carbide grinding bit. For step 1, the protective oxide layer was polished off at 5,000 rpm. For step 2, a different, clean silicon carbide bit was equipped and used to further polish the surface at 10,000 rpm. For step 3, ~15-20 k rpm was used to smooth the surface, obtaining a reflective finish. The resulting polished Ca was then cut into thin strips or punched into 12-mm diameter circular disks and immediately transferred into a reactor for film synthesis ($CaF_2$) or into cells for electrochemical measurements. For electrochemical measurements in glass cells, ~2 minutes occurred between polishing and the beginning of the measurement. For coin cells, ~10 minutes occurred between polishing and coin cell crimping given required cell assembly times.

Synthesis of $CaF_2$-modified Ca electrodes: Freshly-polished and -shaped Ca foils were loaded onto a stainless steel mesh and placed inside a homemade stainless-steel reaction vessel sealed using Cu O-rings, which was purged with argon (Ultra-high purity 5.0 grade, Airgas) for one minute and then pressurized to a final gauge pressure of ~15 psi. The reaction vessel was then placed onto a hot plate inside the Ar glovebox and heated to the desired temperature as measured by an embedded thermocouple, after which the reaction vessel was purged with $NF_3$ (99.999%, Electronic Fluorocarbons, LLC) for one minute and then pressurized to a final gauge pressure of ~5 psi. The reaction vessel remained on the hotplate for one hour until it was purged with Ar (UHP 5.0 grade, Airgas) for five minutes, after which the hotplate was turned off until it cooled down to room temperature. The $CaF_2$-covered samples were then removed from the vessel and immediately utilized for chemical/electrochemical measurements or analysis. Formation of $CaF_2$ was separately confirmed by X-ray diffraction and X-ray photoelectron spectroscopy, and typical thicknesses for the reaction conditions used herein were ~100 nm.

Electrochemical characterization: All steps occurred within an Ar glovebox. As-received THF (anhydrous, 99.9%, Sigma Aldrich) and EC (99%, Acros Organics):PC (99.7%, Sigma Aldrich) (1:1 v/v) were dried over 4 Å molecular sieves for over 72 hours; water content was determined to be <10 ppm through KF titration. $Ca(BH_4)_2$.2THF (Sigma Aldrich) was added to THF and the solution was rested overnight until translucent. $Ca(TFSI)_2$ (99.5%, Solvionic) was vacuum dried at 120° C. overnight in a Buchi apparatus. $Ca(BF_4)_2$ (95%, Apollo Scientific) was vacuumed dried at 120° C. overnight before mixing with EC:PC and then further drying the solution with 4 Å molecular sieves for several days. A glass three-electrode cell (Pine Research, Low Volume Cell) was used for electrochemical measurements. The Au working electrode was 1.6 mm in diameter and surrounded by a PCTFE shroud (Pine Research, LowProfile). Au foil (0.025 mm thick, 99.99%, Sigma Aldrich) was cut into thin strips or 12 mm disks, soaked in sulfuric acid for 20 minutes, and rinsed with deionized water before vacuum drying overnight. Freshly-prepared Ca or Au foil working electrodes were affixed in stainless steel holders and submerged in the electrolyte; the submerged area was measured manually for each electrode after testing. Ca reference electrodes utilized the same setup. A Pt wire coil (Pine Research, LowProfile) was used as the counter electrode. 2032-type coin cells were assembled using a coin cell crimper (MSK-160E, MTI Corporation) inside the Ar glovebox with a crimping pressure of 0.81 tons. Whatman glass fiber separators were used for coin cell measurements. A Bio-Logic potentiostat was used for cyclic voltammetry and galvanostatic experiments. Cyclic voltammetry (CV) sweep rates were 25 mV/s, beginning at the open circuit potential and scanning to −1 and 2 V vs. the Ca reference, unless indicated otherwise.

Materials characterization: Scanning electron microscopy (SEM) imaging was conducted on a Zeiss Merlin high-resolution instrument with an accelerating voltage of 1 kV and a beam current of 100 pA. For SEM measurements performed on post-tested electrodes, samples were first rinsed with THF and then dried under vacuum before being loaded into air-sensitive transfer holders. X-ray diffraction was conducted on a PANalytical X'Pert PRO instrument with a Cu Kα X-ray source. Samples were either put onto glass slides and protected from air using Kapton tape (3M Company) during measurements or placed inside an air-sensitive holder.

Figure 10F:
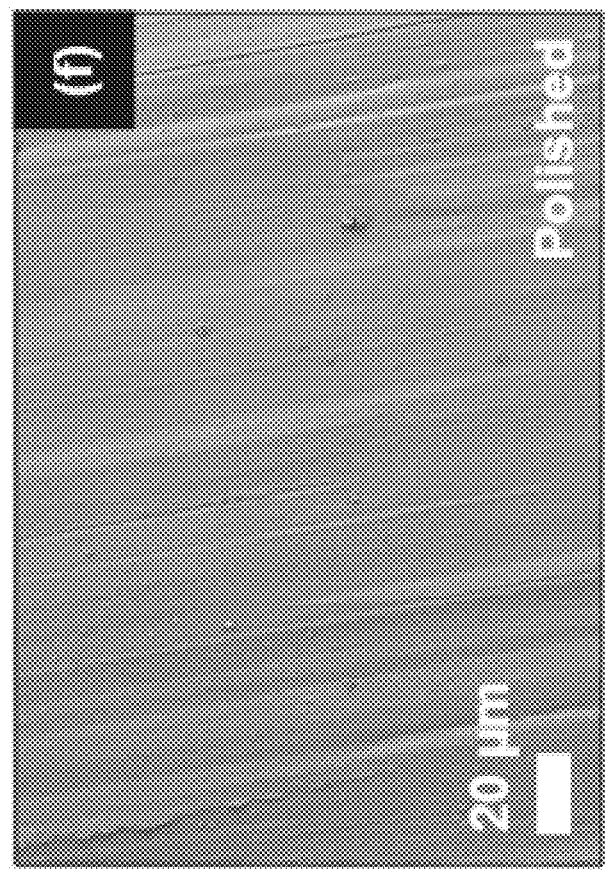
FIG. 10F shows, in accordance with certain embodiments, a SEM image of the mechanically-polished foil.
Figure 10E:
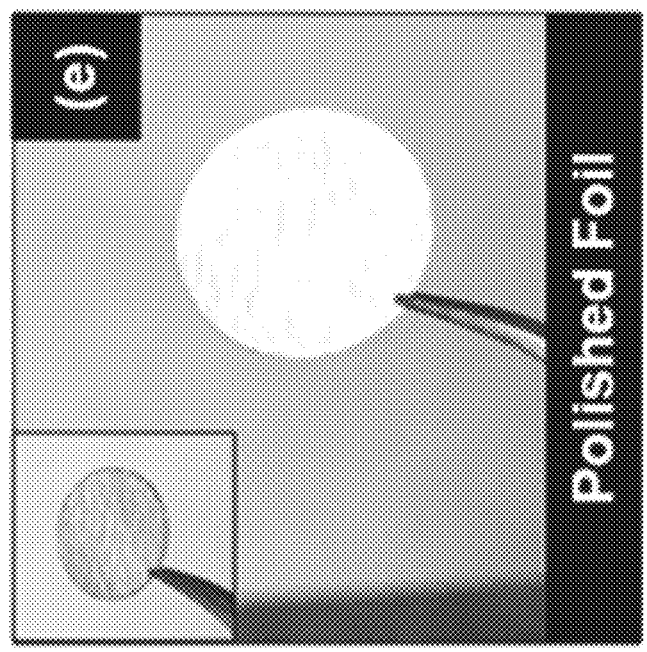
FIG. 10E shows, in accordance with certain embodiments, a photograph of fully-polished Ca foil following subsequent polishing steps, punched into a 12 mm diameter circle.

Results and Discussion: Preparing smooth, consistent Ca foil for electrochemical testing is nontrivial due to its reactivity and relative hardness, which makes it significantly less processable than Li metal. Ca preparation occurred inside an Ar glovebox (<0.1 ppm $O_2$ and $H_2O$). To test different preparation methodologies, Ca was acquired in two forms: so-called dendritic pieces (99.99% pure, shipped under Ar from Sigma Aldrich) and pre-rolled sheets (99.9% pure, 0.25 mm thick, shipped in mineral oil from ACI Alloys) as shown in FIGS. 10A-10F. The dendritic pieces (FIG. 10A) were flattened with a mechanical press; however, inconsistent shapes and surface morphologies were obtained (FIG. 10B). While certain areas of the pressed Ca were quite smooth microscopically, other areas were rough and inconsistent (FIG. 10C). The pre-rolled Ca sheets could be mechanically polished to remove the protective oxide layer and obtain a more consistent surface morphology (FIG. 10D). The polished foils were then cut or punched into desired shapes (FIG. 1E). Microscopically, these polished foils had a relatively smooth morphology albeit with some unavoidable micron-scale striations inherent to the polishing process (FIG. 10F). Different polishing tools were investigated and were found to affect the remaining surface oxide content, with carbide-based tools preferable to oxide-based tools to minimize imparting any additional CaO under aggressive polishing conditions. It should be noted that the polished Ca surface visibly discolors over several days in the glovebox environment, likely due to contamination with trace levels of solvent; this pre-existing layer, detectable electrochemically even when formed over significantly shorter timescales, will be discussed in detail further below. Measurements proceeded using the second preparation method given the superior quality of the obtained surfaces.

Figure 11B:
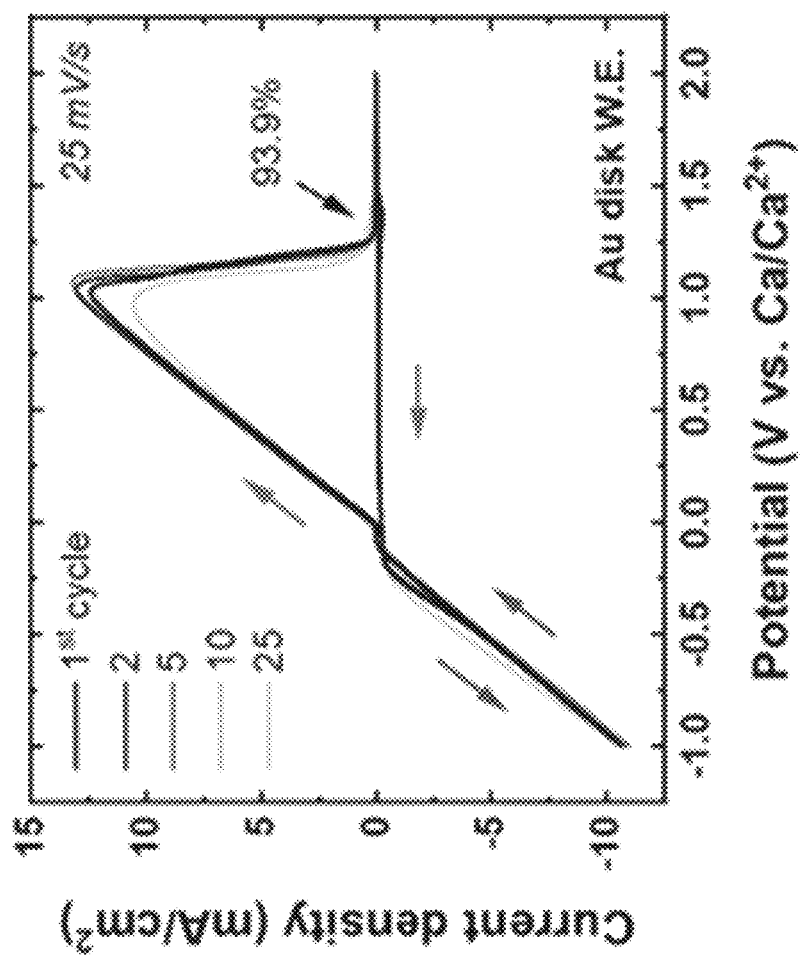
FIG. 11B shows, in accordance with certain embodiments, 25 CV cycles of a gold disk working electrode (WE), with the Coulombic efficiency of the first cycle indicated.
Figure 11A:
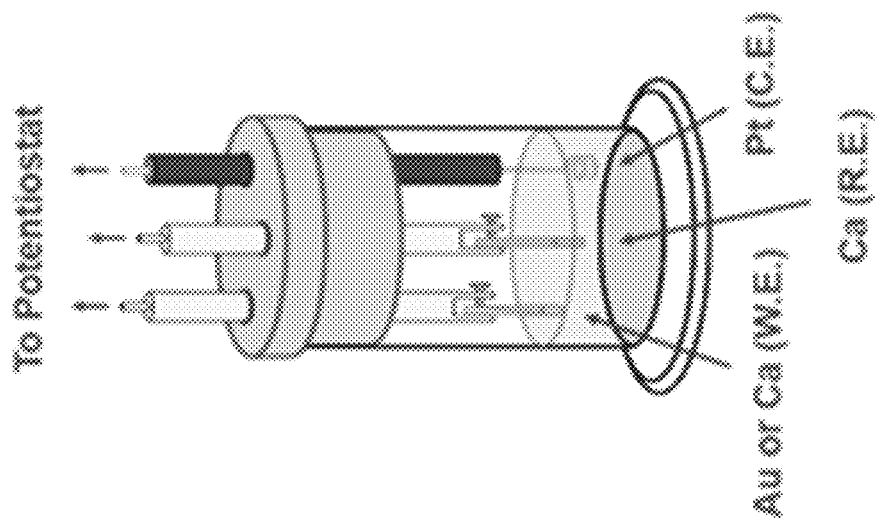
FIG. 11A shows, in accordance with certain embodiments, a schematic diagram of the three-electrode cell used for CV measurements.

After polishing, Ca foil was cut into thin strips, affixed to stainless steel holders, and placed into a three-electrode glass cell (FIG. 11A). The baseline electrochemical evaluation was cyclic voltammetry (CV) in 1.5 M $Ca(BH_4)_2$/THF with a sweep rate of 25 mV/s, a commonly-used scan rate in Ca plating/stripping measurements. Ca foil was used as reference electrode (RE) and a Pt coil was used as counter electrode. FIG. 11B shows the CV behavior using a gold disk working electrode (WE). Upon the cathodic scan, Ca deposition began at an overpotential of $-0.25$ V vs. $Ca/Ca^{2+}$, reaching a maximum plating current density of approximately $-11$ mA/cm$^2$ at $-1$ V Next, the plated Ca was oxidized, with the anodic current density reaching approximately 13 mA/cm$^2$ at 1 V and then dropping down to zero by 1.3 V. Comparing the charge passed during stripping vs. plating, the Coulombic efficiency of this first scan was 93.9%. This electrochemical behavior is also reasonably reversible over subsequent cycles. By scan 25, the general CV shape is similar to that of scan 1, with a relatively minor decrease in maximum oxidative current density ($\sim$10 mA/cm$^2$) and a more significant decrease in CE (86.5%).

Figure 11C:
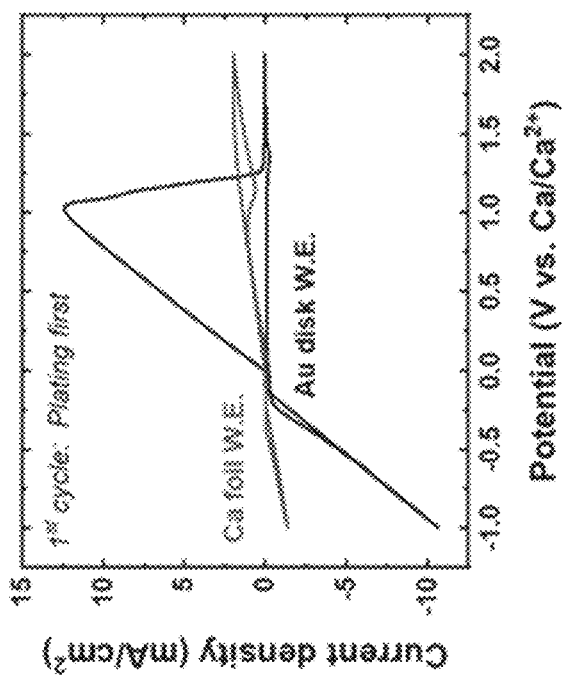
FIG. 11C shows, in accordance with certain embodiments, CV of the first cycle of a Au disk WE and Ca foil WE overlaid.

The same CV scan was next conducted with Ca foil as the WE, which is shown alongside the Au disk WE in FIG. 11C. To calculate areal current density for these electrodes, the submerged surface area was measured after each trial; a typical area was ~0.5 cm$^2$ (compared to 0.02 cm$^2$ for the Au disk WE). With these relatively small areas, rounding error in area calculation could approach ±10%. The current densities of Ca foils were highly reproducible across trials; however, the plating voltage-current slope with the Ca WE was significantly more resistive than that of the Au disk. Consequently, the maximum current density of the Ca WE was nearly an order of magnitude smaller than with the Au WE (1.4 vs. 11 mA/cm$^2$ at $-1$ V vs. $Ca/Ca^{2+}$). In addition, the onset plating potential of the first cycle was $-0.4$ V for Ca, larger than the $-0.25$ V onset plating potential on Au. The origin of these disparities will be discussed in detail later.

Figure 11D:
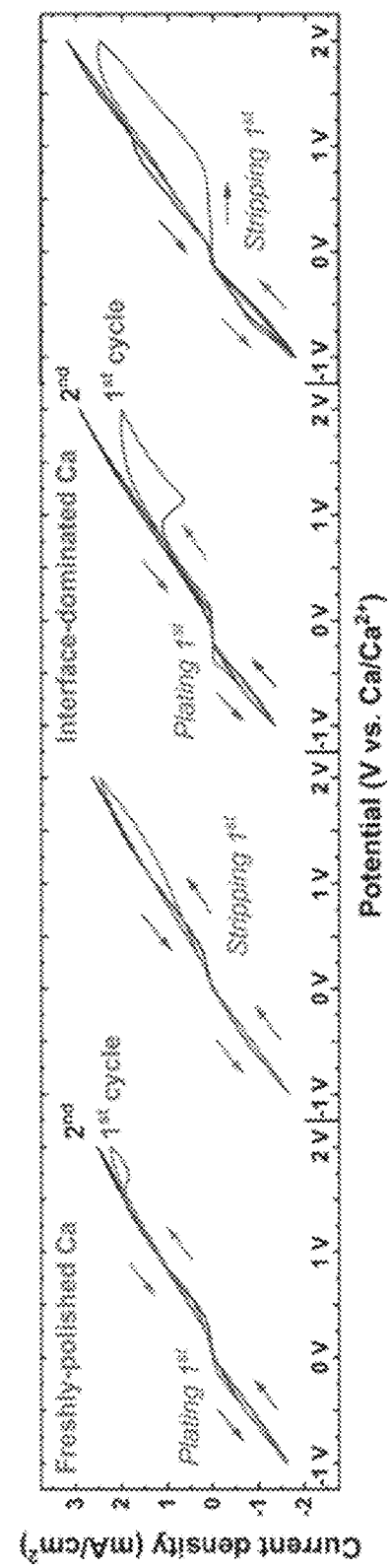
FIG. 11D shows, in accordance wither certain embodiments, CV of the first and second cycles, both "plating first" and "stripping first", of freshly-polished vs. interface-dominated Ca foil WEs.

To more closely examine the origins of unique CV features on the Ca WE, several CV measurements were conducted on Ca foil subjected to either "plating first" or "stripping first" cycles. CVs of freshly-polished Ca foils are shown in FIG. 11D. When extensive efforts were taken to eliminate any possible exposure of the fresh Ca to contaminants such as trace solvent—by extensively purging the glovebox before each measurement and minimizing Ca handling time to <2 min prior to electrolyte immersion—the "freshly-polished" Ca foil (green scans) exhibited quasi-linear behavior upon the plating and stripping scans with minimal deviation between the first and subsequent cycles (quasi-linear denotes that the plating/stripping curves do not go through zero as for a simple resistor, given the presence of plating/stripping overpotentials). This was true regardless of whether plating or stripping occurred first, which is assigned to the intrinsic behavior of Ca foil in this cell configuration and electrolyte. Any deviation from this preparation scheme, however, led to distinct qualitative features on the first cycle, as shown in the red scans in FIG. 11D. These features were particularly evident upon oxidation: for the "plating first" CV, an oxidation onset occurred at 0.1 V, followed by a local maximum in current density near 1 V vs. $Ca/Ca^{2+}$ and subsequent local minimum at 1.2 V. This local minimum, or 'inflection point', corresponded to 74.6% of the plated capacity. However, it is cautioned that this value should not be interpreted as CE because of the large amount of underlying Ca and thus dissimilarity of the measurement conditions from those typically used for CE quantification. In contrast to Au, the current density did not drop back to zero for the Ca electrode upon continued forward scan, and instead began to increase again thereafter, reaching 2 mA/cm$^2$ at 2 V. During this completion of the forward scan, the CV reverted to linear behavior with a slope similar to that observed on the preceding plating scan. This unique stripping feature involving local maxima/minima only occurred when samples were not subjected to the rigorous procedure outline above and are thus attributed to an interface-dominated effect. Notably, this particular interface-dominated effect arises from the past processing history of the Ca foil and not the electrolyte-derived interface (discussed below).

Figure 12B:
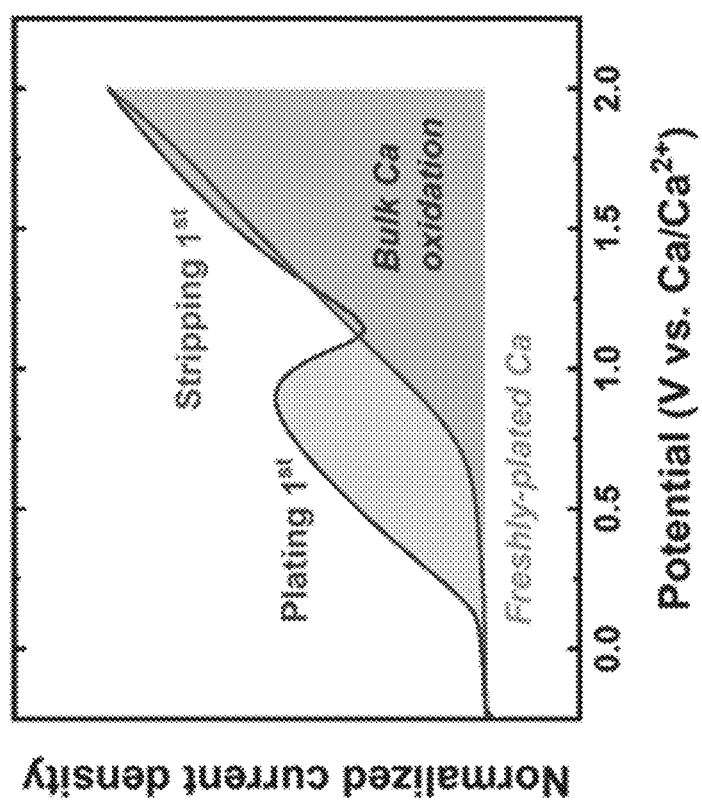
FIG. 12B shows, in accordance with certain embodiments, CV of the forward scans of the same cycles from FIG. 12A overlaid with normalized current density to indicate regions where bulk or freshly-plated Ca is oxidized.
Figure 12A:
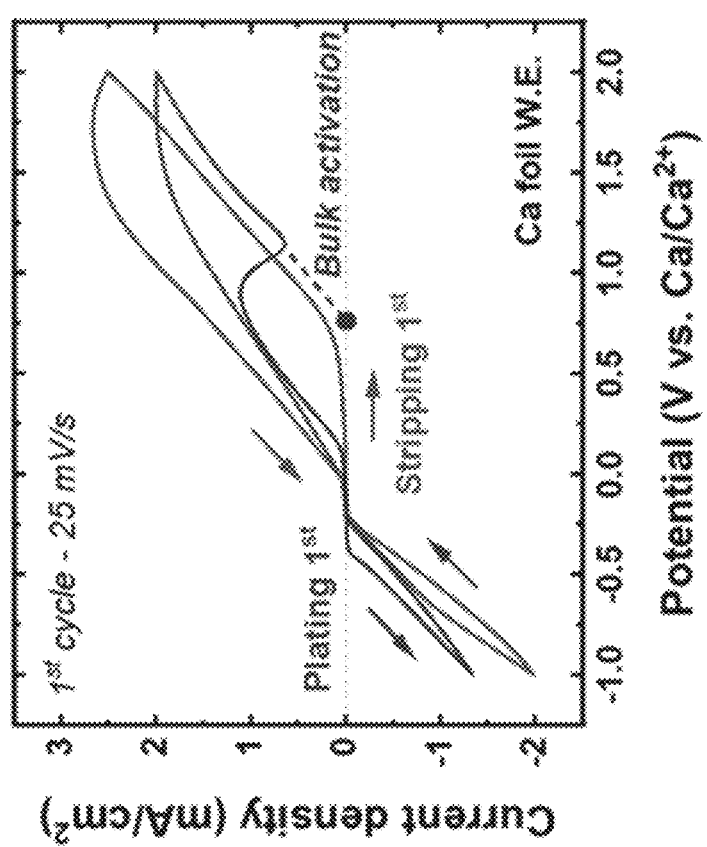
FIG. 12A shows, in accordance with certain embodiments, CV of the "plating first" and "stripping first" cycles of two interface-dominated Ca foil WEs overlaid.

To further investigate the origin of the unique stripping features, a measurement was conducted in a fresh cell by reversing the scan direction such that Ca was stripped, rather than plated, first. A significantly larger overpotential of ~0.7 V (compared to 0.1 V for "plating first") was required before significant Ca oxidation occurred. This was interpreted to reflect the absence of freshly-plated Ca, which apparently oxidizes at lower overpotentials. No local maximum nor minimum were observed. The voltage-current response above 0.7 V vs $Ca/Ca^{2+}$ nearly overlapped with the higher-voltage oxidative portion of the "plating first" sample (FIGS. 12A-12B). This indicates that the linear behavior above 0.7 V vs $Ca/Ca^{21}$ corresponds to stripping of Ca through the pre-existing interface in both samples, i.e., it reflects oxidation of "bulk" Ca within the foil. The following plating scan exhibited a lower overpotential of −0.25 V, akin to Ca nucleation onto the Au disk (and compared to −0.4 V for "plating first"). These results collectively indicate the presence of a pre-existing interface layer on the Ca WE that influences initial plating/stripping. The interface layer is not fully blocking, however, such that initial plating or stripping can occur, and interface-dominated effects disappear on the second scan for either plating- or stripping-first cases (FIG. 11D), indicating that they are altered by active electrochemistry. Specifically, plating creates interface deposits that are more electrochemically accessible than the underlying bulk Ca on subsequent charge; stripping up to high potentials, meanwhile, serves as an activation process that makes subsequent plating more facile.

This electrochemical behavior of Ca foil in $Ca(BH_4)_2$/THF electrolyte contrasts with CVs that investigated Ca electrodes (of size 0.125 $cm^2$) in several inactive electrolytes including carbonates and THF with non-borohydride salts. In those cases, the initial reduction scan typically showed negligible current density (<0.5 $mA/cm^2$) at large cathodic potentials (−1.5 V), and reduction currents at these large overpotentials were attributed to electrolyte decomposition as opposed to active Ca plating. The subsequent oxidation scans showed negligible current density due to electrode passivation until ~1 V vs. $Ca/Ca^{2+}$ for Ca-based salts, after which significant stripping current densities could occur between 1-2 V vs. $Ca/Ca^{2+}$ (1-10 $mA/cm^2$, depending on the electrolyte). With $Ca(BH_4)_2$/THF, on the other hand, higher current densities (1 $mA/cm^2$ in this cell configuration) for both reduction and oxidation are observed within a narrower voltage window (+0.5 V); yet-higher current densities are presented later on.

Figure 13:
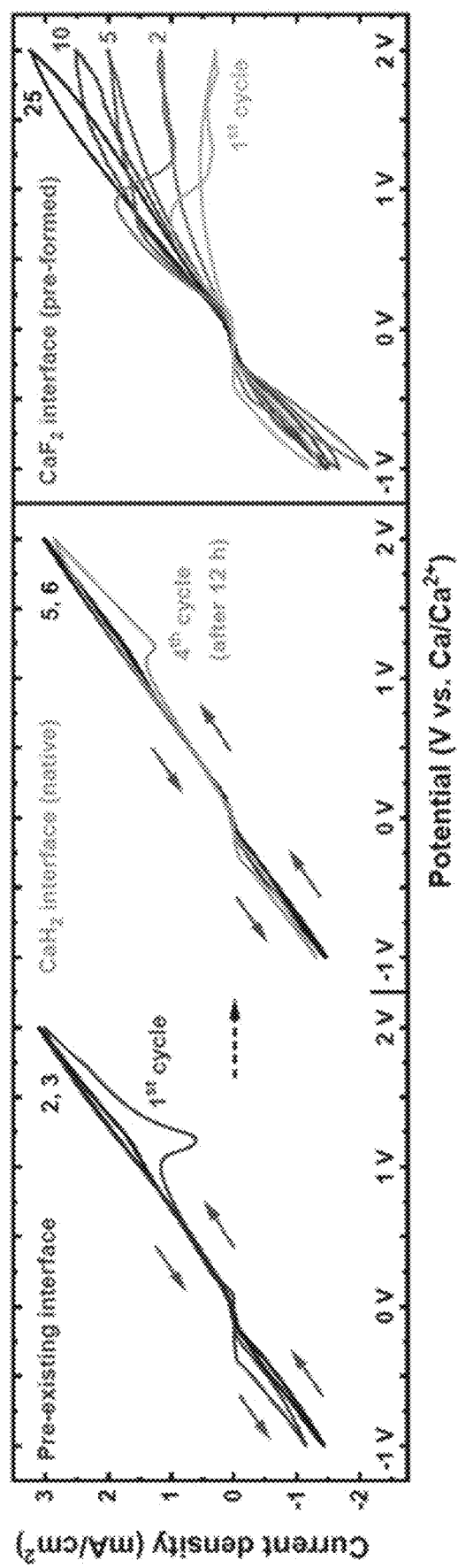
FIG. 13 shows, in accordance with certain embodiments, CV of pre-existing, $CaH_2$, and $CaF_2$ interfaces: (Left) 3 continuous cycles of a Ca WE through the pre-existing interface; (Middle) The same Ca WE was then held at open circuit potential for 12 hours for the native $CaH_2$ interface to form, after which cycles 4-6 were performed; and (Right) 25 cycles of a $CaF_2$-covered Ca WE.
Figure 14B:
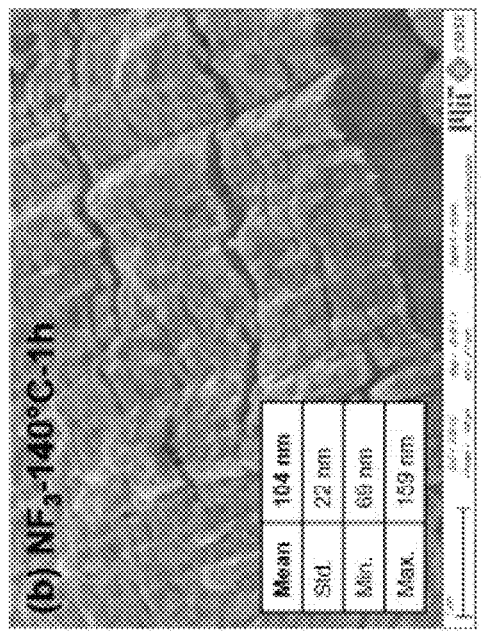
FIG. 14B shows, in accordance with certain embodiments, a high-magnification SEM image at the surface of a $CaF_2$ film ($NF_3$-100° C.-1 h) with ~100 nm thickness.
Figure 15B:
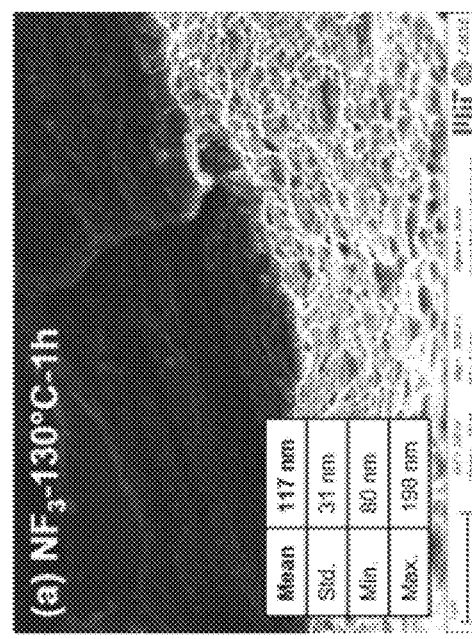
FIGS. 15A-15B show, in accordance with certain embodiments; SEM images of intentionally-broken $CaF_2$ films viewed at a 450 angle.
Figure 14A:
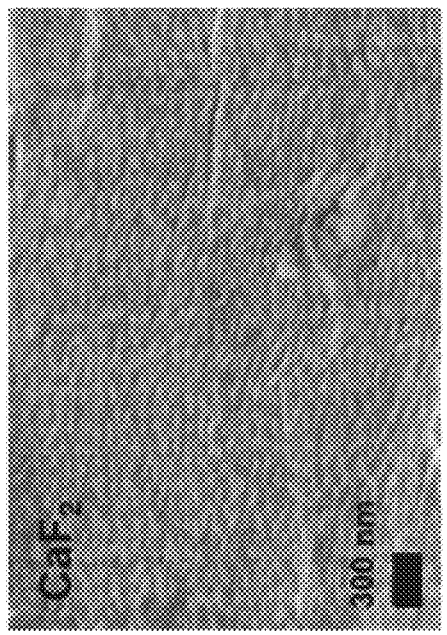
FIG. 14A shows, in accordance with certain embodiments; a SEM image of an intentionally-broken $CaF_2$ film ($NF_3$-230° C.-1 h) viewed at a 45° angle.
Figure 15A:
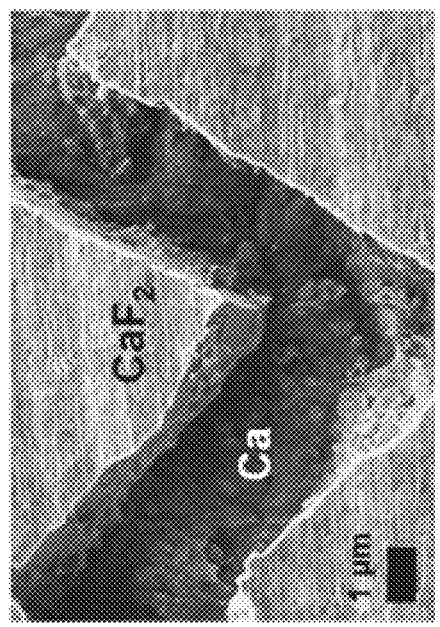

$Ca(BH_4)_2$/THF has been reported to continuously react with exposed Ca metal, forming a $CaH_2$ interface that evolves over a timeframe of ~20 hours. Cross-sectional SEM measurements of a soaked Ca foil (several days) enable visual estimation of this surface layer to be ~20 nm thick. To examine the electrochemical penalty of this native, dynamic $CaH_2$ interface, three CV cycles were initially performed on a freshly-prepared Ca foil to activate access to bulk Ca, returning to 0 V vs. $Ca/Ca^{2+}$, upon which the WE was held at open circuit potential for 12 hours before re-attempting cycling. FIG. 13 shows the subsequent $4^{th}$ CV cycle, which displayed a larger onset plating overpotential of −0.3 V, as well as the re-appearance of an inflection point at 1.2 V vs. $Ca/Ca^{2+}$. These features indicate a transition back to a mode involving electrochemical distinction between surface and bulk Ca stripping. Multiple continuous cycles were run immediately after this $4^{th}$ cycle, and stripping again returned to quasi-linear behavior, reversing the interface-dominance. When the resting time of 1 hour or longer was applied consistently between each cycle, however, the interface features persisted somewhat, though were less-pronounced than the pre-existing interface (FIGS. 11-12), and did not dramatically influence the Ca cycleability in this cell configuration.

A case was next examined in which a well-defined, pre-existing interface was intentionally imparted to the Ca foil prior to cell assembly. The objective of this experiment was to introduce a competitive and well-defined interface prior to Ca coming into contact with significant trace solvent (to the extent possible) or electrolyte, in contrast to the two previous examples of pre-existing and natively-derived SEI. $CaF_2$ was selected for this task as it has been found in the SEI of electrolyte systems. The synthetic interface was kept as thin as possible to avoid complete ionic deactivation. Through fine-tuning of synthesis conditions, nanoscale-thickness, conformal, single-composition $CaF_2$ interfaces on Ca were fabricated by reaction with nitrogen trifluoride ($NF_3$) gas, yielding conformal, ~100 nm thick polycrystalline $CaF_2$ layers with minimal porosity (FIGS. 18A-19B). The first CV cycle at 25 mV/s exhibited a plating overpotential of −0.4 V, comparable to that without $CaF_2$ present, and achieved comparable reduction current (approximately −1 $mA/cm^2$) on the first scan. Upon stripping, compared to previous samples, a more-pronounced inflection point was observed at 1.3 V, indicating a yet-heightened presence of a Ca foil interface, and consistent with understanding developed so far on the origin of this feature. Beyond this point, and in contrast to previous samples, the current density remained below 0.5 $mA/cm^2$ for the remainder of the oxidative scan, indicating that the artificial $CaF_2$ interface more thoroughly suppressed access to the underlying bulk Ca than the pre-existing or $CaH_2$ interface. In comparison, the second cycle had a higher-magnitude plating current density (−2.2 vs. −1.4 $mA/cm^2$), a smaller onset plating overpotential (−0.25 vs. −0.4 V), and larger currents over the entire oxidative range, indicating that both interface-dominated and bulk Ca stripping became more electrochemically active. Further cycles approached quasi-linear behavior, with the inflection points gradually becoming less pronounced. It should be noted that $CaF_2$ films became chemically unstable after several days of soaking in $Ca(BH_4)_2$/THF; however, the films were resilient to the short timescales (<2 hours) required of CV testing. SEM images post-cycling indicated nodule-like deposition morphologies, separated by areas of smooth $CaF_2$ film (FIGS. 6A-6B).

The combined inflection-points and observed Ca morphologies appear to be a consistent phenomenon when Ca plating/stripping occurs through an inhibitive Ca interface. Although the post-cycling Ca WE had deposition structures that were relatively smooth and interconnected in comparison with the separated nodules through $CaF_2$, the Ca WE surface still exhibited distinct electrochemically-inactive areas that presumably resulted from the initial pre-existing interface, and the plating/stripping of subsequent cycles preferentially occurred on the freshly-plated Ca deposits. It is suggested that these highly-localized growth modes arise from weak points in an inhibitive interface, such that current is focused through selective locations, where Ca plates through the interface and establishes a fresh Ca surface facing the electrolyte. These nodules then have direct electrochemical access to the electrolyte upon stripping, thus are more-readily oxidized than the underlying bulk Ca. Both $CaH_2$ and $CaF_2$ have been proposed to support anion conduction, thus ion transport through the interface could be more complex than with cation-conductive SEI. More studies would be beneficial to characterize nucleation and growth modes of Ca through other relevant interfaces.

Further detail regarding this study can be found in Melemed, A. M and Gallant, B. M, J. Electrochem. Soc., 2020, 167, 140543, which is incorporated herein by reference in its entirety.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of," or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A battery comprising:
    an electrode comprising an alkaline earth metal; and
    a passivation material in direct contact with the electrode, wherein the passivation material comprises an alkaline earth fluoride in an amount greater than or equal to 90 mol. % based on a total number of moles in the passivation material.

2. The article of claim 1, wherein the electrode comprises the alkaline earth metal in an amount greater than or equal to 90 mol. % based on a total number of moles in the electrode.

3. The article of claim 1, wherein the electrode comprises the alkaline earth metal in an amount greater than or equal to 99.9 mol. % based on a total number of moles in the electrode.

4. The article of claim 1, wherein the electrode is at least partially in the form of a layer.

5. The article of claim 1, wherein the alkaline earth metal is calcium (Ca).

6. The article of claim 1, wherein the alkaline earth metal is magnesium (Mg).

7. The article of claim 1, wherein the alkaline earth fluoride is $CaF_2$.

8. The article of claim 1, wherein the alkaline earth fluoride is $MgF_2$.

9. The article of claim 1, wherein the passivation material is at least partially in the form of a layer.

10. The article of claim 1, wherein the passivation material has an average thickness less than or equal to 200 micrometers.

11. The article of claim 1, wherein the passivation material is crystalline.

12. The article of claim 1, wherein the passivation material has an ionic conductivity greater than or equal to $10^{-14}$ S/cm and less than or equal to $10^{-8}$ S/cm.

13. The article of claim 1, wherein the passivation material has a cationic transference number greater than or equal to 0.5 and less than 1.

14. The article of claim 1, wherein the passivation material has an anionic transference number greater than or equal to 0.5 and less than 1.

15. The article of claim 1, wherein the passivation material is configured to protect at least a portion of the electrode.

16. The article of claim 1, wherein an amount of one or more contaminants in the passivation material at a depth up to 1 micrometer is less than or equal to 10 mol. % based on a total number of moles in the passivation material.

17. The article of claim 16, wherein the one or more contaminants comprise sulfur, carbon, hydrogen, oxygen, an electrolyte, and/or a solvent derived contaminant.

18. The article of claim 1, wherein an amount of one or more contaminants in the passivation material at a surface of the passivation material is less than or equal to 10 mol. % based on a total number of moles in the passivation material.

19. The article of claim 18, wherein the one or more contaminants comprise sulfur, carbon, hydrogen, oxygen, an electrolyte, and/or a solvent derived contaminant.

20. The article of claim 1, wherein the passivation layer is formed by reacting the alkaline earth metal with a gas.

\* \* \* \* \*